United States Patent
Kim et al.

(10) Patent No.: US 10,050,681 B2
(45) Date of Patent: Aug. 14, 2018

(54) APPARATUS AND METHOD FOR PERFORMING BEAMFORMING BY USING ANTENNA ARRAY IN WIRELESS COMMUNICATION SYSTEM

(71) Applicant: Samsung Electronics Co., Ltd., Suwon-si, Gyeonggi-do (KR)

(72) Inventors: Jaewon Kim, Seoul (KR); Hyunkyu Yu, Suwon-si (KR); Jeongho Park, Seoul (KR); Kyungwhoon Cheun, Seoul (KR); Jongho Oh, Suwon-si (KR); Sung Tae Choi, Hwaseong-si (KR); Jung Il Han, Seongnam-si (KR); Sooyoung Hur, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 37 days.

(21) Appl. No.: 15/181,957

(22) Filed: Jun. 14, 2016

(65) Prior Publication Data

US 2016/0365900 A1    Dec. 15, 2016

(30) Foreign Application Priority Data

Jun. 15, 2015 (KR) .................. 10-2015-0084312

(51) Int. Cl.
*H04B 7/04* (2017.01)
*H04B 7/06* (2006.01)
(Continued)

(52) U.S. Cl.
CPC ......... *H04B 7/0408* (2013.01); *H04B 7/0617* (2013.01); *H04B 7/0691* (2013.01); *H04B 7/10* (2013.01); *H04L 5/0048* (2013.01)

(58) Field of Classification Search
CPC .. H04B 7/0408; H04B 7/0691; H04B 7/0617; H04B 7/10; H04L 5/0048
(Continued)

(56) References Cited

U.S. PATENT DOCUMENTS 6,470,192 B1 * 10/2002 Karlsson ............... H01Q 1/246
                                                         455/25
8,588,193 B1    11/2013 Ho et al.
(Continued)

FOREIGN PATENT DOCUMENTS

WO    2015/000519 A1    1/2015

*Primary Examiner* — Michael Mapa
(74) *Attorney, Agent, or Firm* — Jefferson IP Law, LLP

(57) ABSTRACT

The present disclosure relates to a pre-5$^{th}$-generation (5G) or 5G communication system to be provided for supporting higher data rates beyond 4$^{th}$-generation (4G) communication system such as long term evolution (LTE). An apparatus and a method for performing beamforming by using an antenna array in a wireless communication system are provided. The apparatus includes at least one antenna array comprising antenna elements, a control unit configured to determine a number of beams to be formed through the at least one antenna array, and a communication unit configured to adjust paths associated with the antenna elements in order to configure as many antenna subsets as the number of the beams, and to form at least one beam through at least one antenna subset configured from the at least one antenna array.

20 Claims, 24 Drawing Sheets

(51) Int. Cl.
   *H04B 7/10*      (2017.01)
   *H04L 5/00*      (2006.01)
   *H04B 7/0408*    (2017.01)

(58) Field of Classification Search
   USPC .......... 455/13.3, 19, 25, 63.4, 82–83, 193.1,
                               455/269, 279.1, 575.7
   See application file for complete search history.

(56) References Cited

U.S. PATENT DOCUMENTS

| | | |
|---|---|---|
| 2002/0021246 A1 | 2/2002 | Martek et al. |
| 2004/0164919 A1* | 8/2004 | Nilsson .................. H01Q 1/242 343/833 |
| 2005/0078047 A1 | 4/2005 | Chiang et al. |
| 2007/0093269 A1 | 4/2007 | Leabman |
| 2007/0285312 A1* | 12/2007 | Gao ....................... H01Q 1/246 342/367 |
| 2010/0297971 A1* | 11/2010 | Persson ................ H01Q 21/245 455/127.2 |
| 2013/0088391 A1* | 4/2013 | Corman .................. H04B 7/10 342/365 |
| 2013/0343235 A1 | 12/2013 | Khan |
| 2014/0269964 A1 | 9/2014 | Du et al. |
| 2014/0313081 A1* | 10/2014 | Tan ......................... H01Q 3/00 342/377 |
| 2015/0009951 A1 | 1/2015 | Josiam et al. |
| 2015/0080005 A1 | 3/2015 | Molnar et al. |
| 2015/0162971 A1* | 6/2015 | Kobayashi ............... H01Q 3/24 455/62 |

\* cited by examiner

◄---- Direction of narrow beam
◄—— Direction of wide beam

◄---- Direction of narrow beam
◄—— Direction of wide beam

APPARATUS AND METHOD FOR PERFORMING BEAMFORMING BY USING ANTENNA ARRAY IN WIRELESS COMMUNICATION SYSTEM

CROSS-REFERENCE TO RELATED APPLICATION(S)

This application claims the benefit under 35 U.S.C. § 119(a) of a Korean patent application filed on Jun. 15, 2015 in the Korean Intellectual Property Office and assigned Serial number 10-2015-0084312, the entire disclosure of which is hereby incorporated by reference.

TECHNICAL FIELD

The present disclosure relates to beamforming in a wireless communication system.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for beamforming in a wireless communication system.

Another aspect of the present disclosure is to provide an apparatus and a method for adjusting the number of beams in a wireless communication system.

Another aspect of the present disclosure is to provide an apparatus and a method for adjusting the number of beams adaptively to communication conditions in a wireless communication system.

Another aspect of the present disclosure is to provide an apparatus and a method for adjusting the number of beams by controlling a path between circuits for processing signals and antenna elements in a wireless communication system.

Another aspect of the present disclosure is to provide an apparatus and a method for forming multiple beams having different polarizations in a wireless communication system.

Another aspect of the present disclosure is to provide an apparatus and a method for determining an optimal beam by using multiple beams having different polarizations in a wireless communication system.

In accordance with an aspect of the present disclosure, an apparatus for performing beamforming is provided. The apparatus includes at least one antenna array comprising antenna elements, a control unit configured to determine the number of beams to be formed through the at least one antenna array, and a communication unit configured to configure paths associated with the antenna elements in order to configure as many antenna subsets as the number of the beams, and to form at least one beam through at least one antenna subset configured from the at least one antenna array.

In accordance with another aspect of the present disclosure, an operating method of an apparatus for performing beamforming is provided. The operating method includes determining the number of beams to be formed through at least one antenna array, configuring paths associated with antenna elements in order to configure as many antenna subsets as the number of the beams, and forming at least one beam through at least one antenna subset configured from the at least one antenna array.

In a wireless communication system, a path can be adaptively configured and thereby, beamforming suitable for a communication environment can be performed.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions in the present disclosure and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more such surfaces.

Hereinafter, technology for beamforming in a wireless communication system will be described in various embodiments of the present disclosure. Specifically, beamforming technology capable of adaptively adjusting the number of beams will be described in embodiments of the present disclosure.

Terms referring to entities that perform communication, terms referring to elements that configure an antenna, terms referring to signals transmitted by the entities, a term (e.g., group) for distinguishing a set of apparatuses from another, a term (e.g., sweeping) referring to the processing of a signal, and the like, which are used in the following description, are exemplified for convenience of description. Accordingly, the various embodiments of the present disclosure are not limited to the terms set forth below, and another term having an equivalent technical meaning may be used.

Figure 1A:
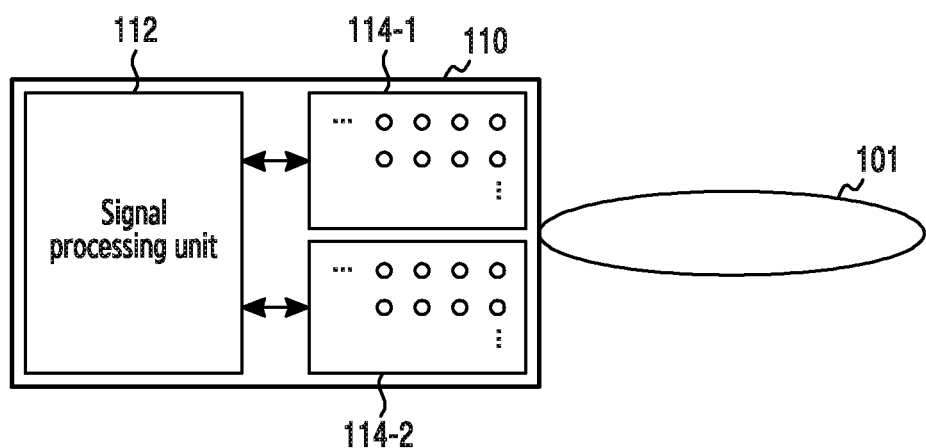
FIGS. 1A and 1B illustrate beam patterns which may be formed by a wireless communication system according to an embodiment of the present disclosure.
Figure 1B:
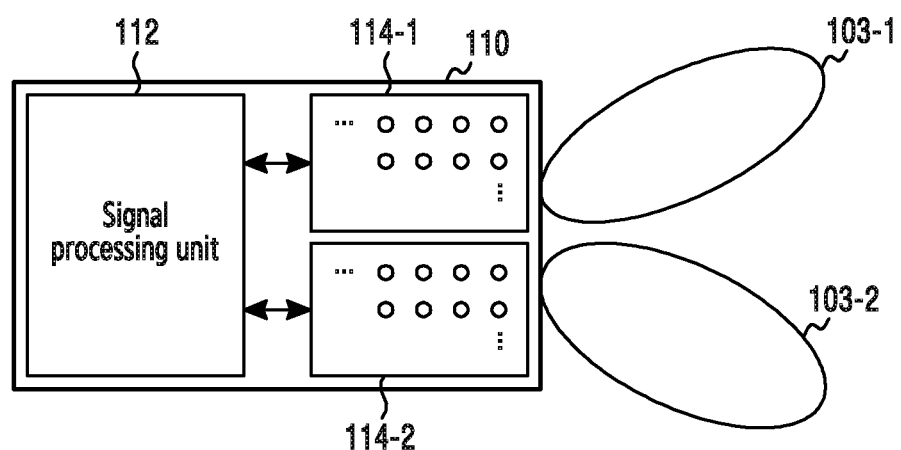

FIGS. 1A and 1B illustrate beam patterns which may be formed by a wireless communication system according to an embodiment of the present disclosure. FIGS. 1A and 1B illustrate beam patterns which may be formed by a device 110. Terms, such as '~ unit,' '~ er (or),' and the like, used hereinbelow refer to a unit that processes at least one function or operation, and this unit may be implemented in hardware, software, or a combination thereof.

Referring to FIGS. 1A and 1B, the device 110 includes a signal processing unit 112 that processes a transmission signal and a reception signal, and antenna arrays 114-1 and 114-2. In the present example, the device 110 may form one beam 101 through all of the antenna arrays 114-1 and 114-2 as illustrated in FIG. 1A, or may simultaneously form two beams 103-1 and 103-2 through the respective antenna arrays 114-1 and 114-2 as illustrated in FIG. 1B.

In the present example, the number of physical antenna elements included in each of the antenna arrays 114-1 and 114-2 does not change, and thus, the number of antenna elements used to form one of the beams 103-1 and 103-2 may not be greater than the number of antenna elements used to form the beam 101. Accordingly, the beam 101 may have a narrower beamwidth than one of the beams 103-1 and 103-2.

Specifically, the device 110 may form a single beam by using all of the antenna arrays 114-1 and 114-2 according to circumstances, or may form multiple beams by separately using the respective antenna arrays 114-1 and 114-2. Through this configuration, according to channel conditions, the device 110 may operate as a transmitter having beamformed multiple output ports or a receiver having beamformed multiple input ports, or may operate as a transmitter having beamformed one output port or a receiver having beamformed one input port. For example, the device 110 may perform beamformed multiple-input multiple-output (MIMO) transmission or reception, or may perform beamformed single input single output (SISO) transmission or reception.

In FIGS. 1A and 1B, cases are described as examples in which the number of beams is equal to 1 and the number of beams is equal to 2. However, according to an embodiment of the present disclosure, the device 110 may form three or more beams. Specifically, the device 110 may include three or more antenna arrays, in which the device 110 may form three or more beams.

In addition, FIGS. 1A and 1B illustrate the two antenna arrays (e.g., the antenna arrays 114-1 and 114-2). However, according to an embodiment of the present disclosure, the device 110 may include one antenna array. In addition, the one antenna array may include two sub-arrays, and the two sub-arrays may be used similarly to the antenna arrays 114-1 and 114-2.

In various embodiments of the present disclosure as described below, for convenience of description, a case is described as an example in which multiple antenna arrays are included. However, similarly, embodiments of the present disclosure, which are similar to the case where multiple antenna arrays are included, may be applied to multiple sub-arrays included in one antenna array.

Figure 2:
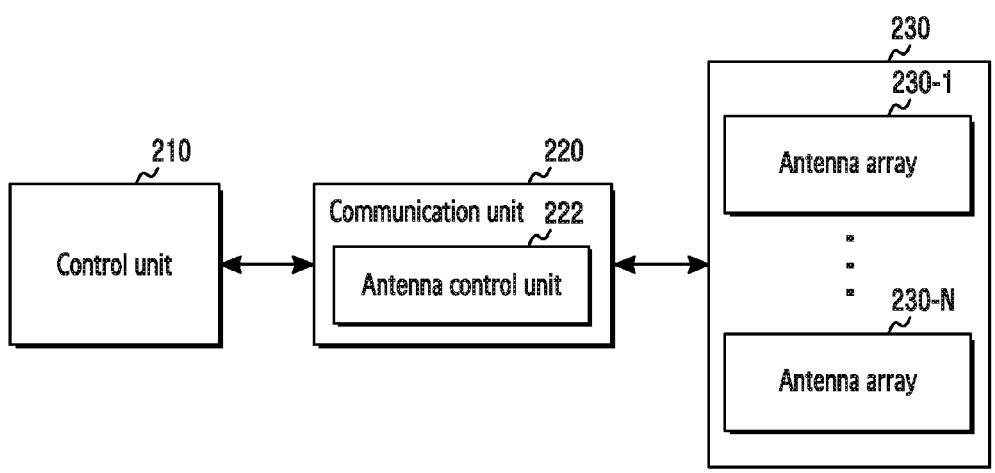
FIG. 2 is a block diagram illustrating a device in a wireless communication system according to an embodiment of the present disclosure.

FIG. 2 is a block diagram illustrating a device in a wireless communication system according to an embodiment of the present disclosure. FIG. 2 exemplifies a configuration of the device 110. Terms, such as '~ unit,' '~ er (or),' and the like, used hereinbelow refer to a unit that processes at least one function or operation, and this unit may be implemented in hardware, software, or a combination thereof.

Referring to FIG. 2, the device may include a control unit 210, a communication unit 220, and an antenna array set 230. The communication unit 220 may include the signal processing unit illustrated in FIGS. 1A and 1B, and the antenna array set 230 may include the antenna arrays illustrated in FIGS. 1A and 1B.

The control unit 210 controls overall operations of the device. For example, the control unit 210 controls the communication unit 220 and the antenna array set 230 to transmit or receive a signal. To this end, the control unit 210 may include at least one processor. More particularly, according to an embodiment of the present disclosure, the control unit 210 may determine a beam pattern to be used to transmit or receive a signal. In the present example, the beam pattern includes the number of beams, and characteristics (e.g., beamwidth, beam power, polarization, and the like) of each beam. For example, the control unit 210 may control the device to operate as described below.

The communication unit 220 performs functions for transmitting and receiving signals through a wireless channel. Specifically, the communication unit 220 includes a circuit for processing a signal. For example, the communication unit 220 performs a function of conversion between a baseband signal and a bit stream according to a physical layer standard of the system. For example, when data is transmitted, the communication unit 220 generates complex symbols by encoding and modulating a transmission bit stream. In addition, when data is received, the communication unit 220 reconstructs a reception bit stream by demodulating and decoding a baseband signal. In addition, the communication unit 220 up-converts a baseband signal into a radio frequency (RF) band signal and transmits the RF band signal through the antenna array set 230, and down-converts an RF band signal, which has been received through the antenna array set 230, into a baseband signal. For example, the communication unit 220 may include a transmission filter, a reception filter, an amplifier, a mixer, an oscillator, a digital-to-analog converter (DAC), an analog-to-digital converter (ADC), and the like. In addition, the communication unit 220 may include multiple RF chains. Further, the communication unit 220 may perform beamforming. For the beamforming, the communication unit 220 may adjust phases and magnitudes of respective signals transmitted and received through antenna elements within the antenna array set 230.

According to embodiments of the present disclosure, the communication unit 220 includes an antenna control unit 222. The antenna control unit 222 controls a mapping relationship between the communication unit 220 and the antenna arrays included in the antenna array set 230 so as to form at least one beam according to a beam pattern determined by the control unit 210. For example, the antenna control unit 222 may include at least one switch.

The antenna array set 230 radiates a transmission signal, which is provided by the communication unit 220, as a radio wave, and provides a reception signal, which is generated from a radio wave corresponding to the reception signal, to the communication unit 220. The antenna array set 230 includes multiple antenna arrays 230-1 to 230-N. In the present example, N represents an integer greater than or equal to 2, and a specific value of N may change according to various embodiments of the present disclosure. According to an embodiment of the present disclosure, the antenna array set 230 may form one beam through multiple antenna arrays, or may form multiple beams through multiple antenna subsets. In the present example, the antenna subset includes at least one antenna array.

For example, the antenna array set 230 may include two antenna arrays. In this case, the two antenna arrays may form one beam. Alternatively, one antenna subset including one antenna array may form one beam, and the other antenna subset including the other antenna array may form the other beam.

As another example, the antenna array set 230 may include three antenna arrays. In this case, the three antenna arrays may form one beam. Alternatively, one antenna subset including two antenna arrays may form one beam, and the other antenna subset including the remaining one antenna array may form the other beam. Alternatively, one antenna subset including one antenna array may form one beam, and another antenna subset including another antenna array may form another beam, and still another antenna subset including still another antenna array may form still another beam.

Figure 3:
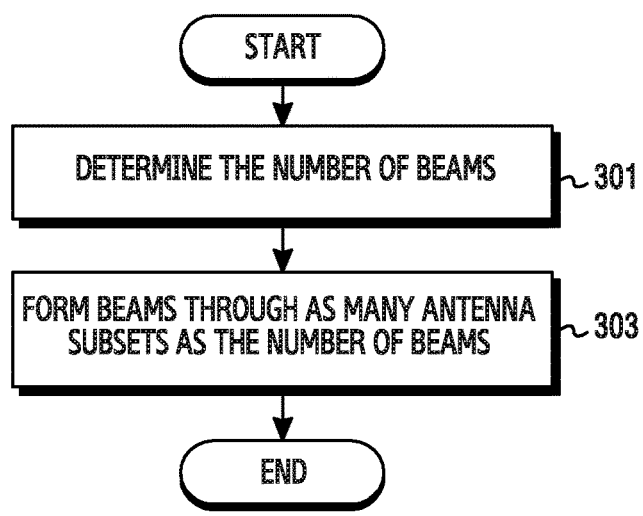
FIG. 3 is a flowchart illustrating an operation procedure of a device in a wireless communication system according to an embodiment of the present disclosure.

FIG. 3 is a flowchart illustrating an operation procedure of a device in a wireless communication system according to an embodiment of the present disclosure. FIG. 3 illustrates an operating method of the device 110.

Referring to FIG. 3, in operation 301, the device 110 determines the number of beams. The number of beams may be determined based on at least one of channel quality, a carrier frequency, and a request of a counterpart device. In addition, the device 110 may further determine the characteristics (e.g., beamwidth, beam power, polarization, and the like) of each beam.

In operation 303, the device 110 forms as many beams as the number of beams through as many antenna subsets as the number of beams. For example, the device 110 may form at least one beam through at least one antenna subset. Specifically, when the number of beams is equal to 2 or more, the device 110 divides the antenna arrays into two or more antenna subsets, configures a path between a signal processing circuit and antenna arrays so as to allow the antenna subsets to form different beams, and forms the two or more beams. For example, in order to configure the path, the device 110 may control at least one switch.

As described above, the device according to an embodiment of the present disclosure may form two or more beams through one antenna array. At this time, the two or more beams may interfere with each other. Accordingly, in order to reduce a correlation between the two or more beams, the device may adopt an antenna array having a structure illustrated in FIG. 4.

Figure 4:
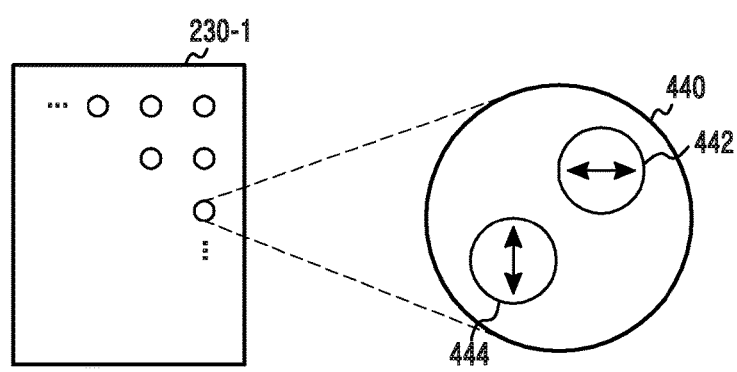
FIG. 4 illustrates a structure of an antenna element in a wireless communication system according to an embodiment of the present disclosure.

FIG. 4 illustrates a structure of an antenna element in a wireless communication system according to an embodiment of the present disclosure. FIG. 4 illustrates the configuration of the antenna array 230-1 included in the antenna array set 230.

Referring to FIG. 4, the antenna array 230-1 includes multiple antenna elements 440's, and one antenna element includes subunits having different polarization characteristics. For example, the subunits may include a first-type subunit 442 having a horizontal polarization characteristic and a second-type subunit 444 having a vertical polarization characteristic. The first-type subunit 442 and the second-type subunit 444 may be used selectively or simultaneously. In other words, only one of the first-type subunit 442 and the second-type subunit 444 may be selectively enabled, or both thereof may be simultaneously enabled. In the present example, the term "enable" refers to a state of radiating a signal or a state of receiving a signal.

Accordingly, the device may control antenna elements such that subunits having different polarization characteristics are enabled for each antenna subset, and thereby may remove or reduce interference between beams formed through the respective antenna subsets. For example, when two beams are formed, the device may enable the first-type subunit 442 having the horizontal polarization characteristic in antenna elements of one antenna subset, and may enable the second-type subunit 444 having the vertical polarization characteristic in antenna elements of the other antenna subset. Accordingly, the two beams having different polarization characteristics may be formed.

FIG. 4 illustrates an example in which the antenna element 440 includes the two subunits 442 and 444. However, according to an embodiment of the present disclosure, the antenna element 440 may further include at least one subunit having still another polarization characteristic. In addition, the subunits 442 and 444 have the horizontal polarization characteristic and the vertical polarization characteristic, respectively. However, according to an embodiment of the present disclosure, one of the subunits 442 and 444 may have a polarization characteristic (e.g., a circular polarization, and the like) other than the horizontal polarization characteristic and the vertical polarization characteristic.

Through the above-described structure of the antenna array, various embodiments of the present disclosure may support various different modes by changing a MIMO order, a polarization characteristic, and a beamwidth. Hereinafter, various embodiments of the present disclosure which support operations in various modes will be described.

Figure 5:
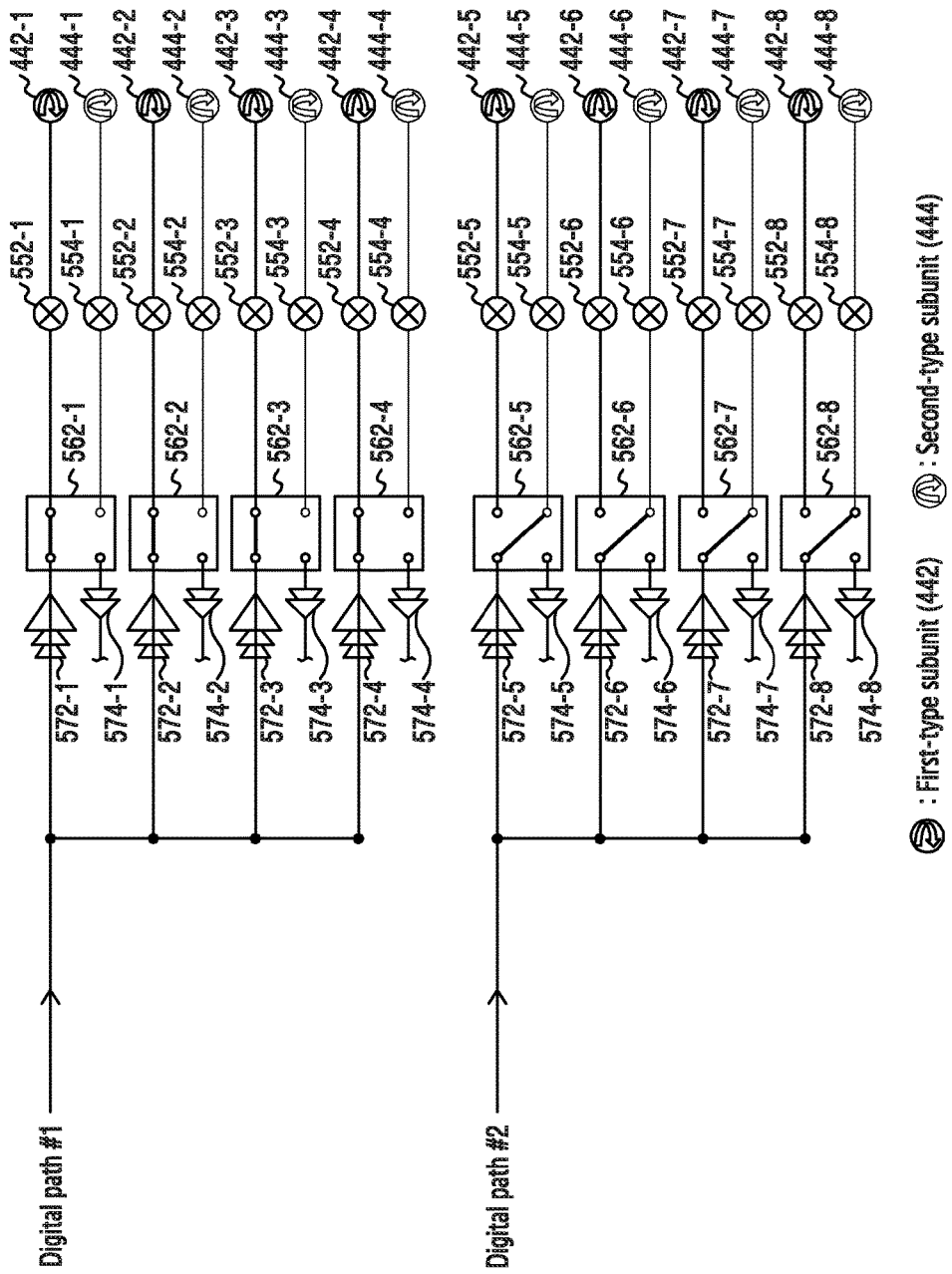
FIG. 5 illustrates a logical structure of a device for transmitting and receiving signals in a wireless communication system according to an embodiment of the present disclosure.

FIG. 5 illustrates a logical structure of a device for transmitting and receiving signals in a wireless communication system according to an embodiment of the present disclosure. FIG. 5 illustrates a logical structure of a circuit for processing a signal and an antenna array in the device 110. FIG. 5 illustrates a case in which two antenna arrays are included. However, a similar structure may also be applied to a case in which three or more antenna arrays are included.

Referring to FIG. 5, the device includes first-type subunits 442-1 to 442-8 all having a horizontal polarization characteristic, second-type subunits 444-1 to 444-8 all having a vertical polarization characteristic, phase shifters 552-1 to 552-8 respectively corresponding to the first-type subunits 442-1 to 442-8, phase shifters 554-1 to 554-8 respectively corresponding to the second-type subunits 444-1 to 444-8, switches 562-1 to 562-8, power amplifiers (PAs) 572-1 to 572-8, and low-noise amplifiers (LNAs) 574-1 to 574-8.

Referring to FIG. 5, the device includes two antenna arrays, and each of the two antenna arrays corresponds to one digital path capable of processing a base band signal. Multiple antenna elements are arranged in each antenna array, and each antenna element includes the two subunits 442 and 444 having different polarization characteristics. FIG. 5 illustrates an example of antenna elements, each of which is formed by the first-type subunit 442 having the horizontal polarization characteristic and the second-type subunit 444 having the vertical polarization characteristic which are of two types.

Subunits all having an identical polarization characteristic all have an identical channel propagation characteristic, and thus are advantageous with respect to beamforming transmission. For example, in the case of FIG. 5, the switches 562 may allow the first-type subunits 442-1 to 442-4 of the antenna elements included in the first antenna array through switches 562 to be connected, and thereby, polarization characteristics of all of the antenna elements connected to a digital path #1 corresponding to the first antenna array are all a horizontal polarization characteristic, and may be controlled. The switches 562 may allow the second-type subunits 444-5 to 444-8 of the antenna elements included in the second antenna array through switches 562 to be connected, and thereby, polarization characteristics of all of the antenna elements connected to a digital path #2 corresponding to the second antenna array are all a vertical polarization characteristic, and may be controlled.

Figure 6A:
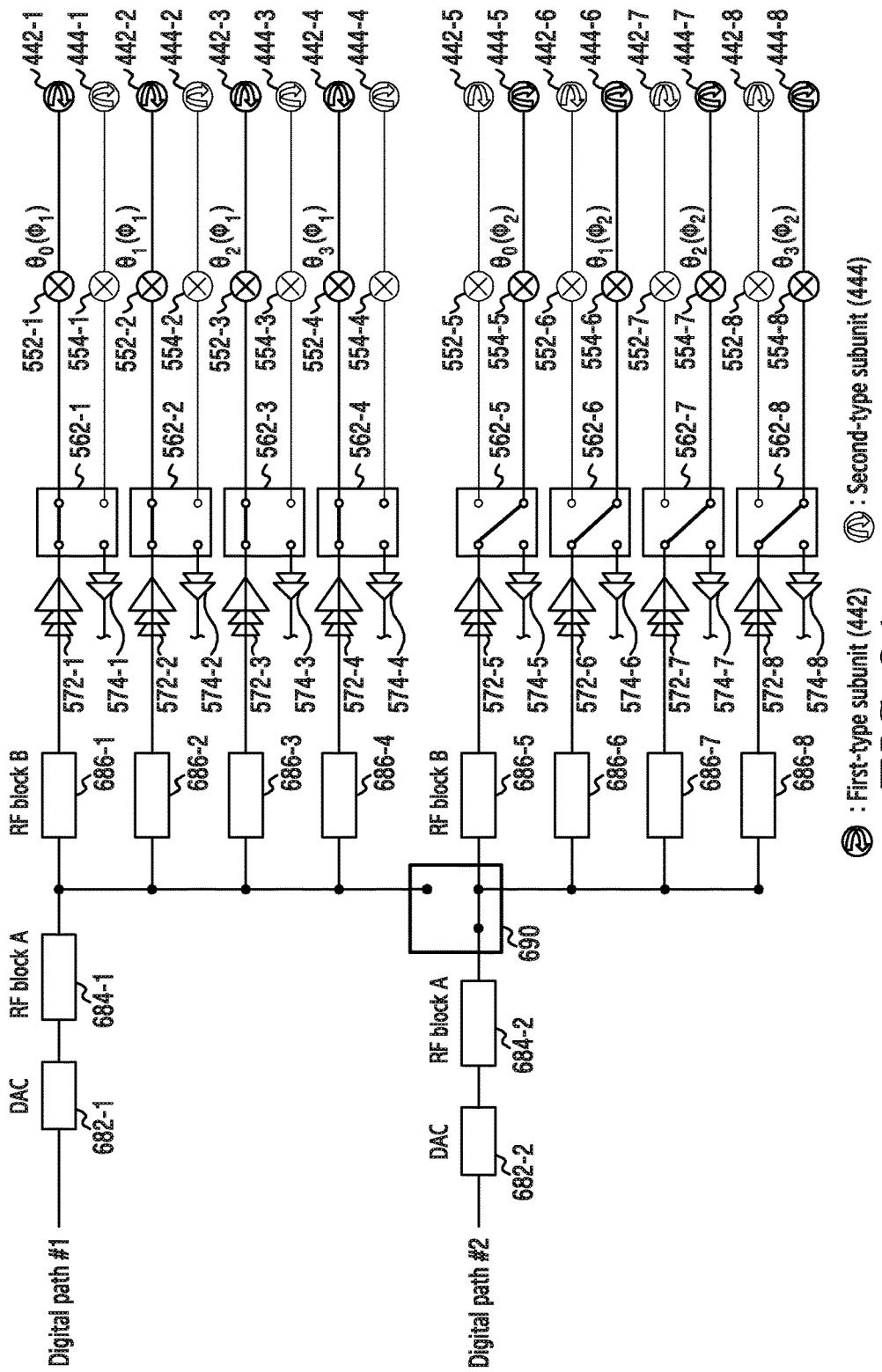
FIGS. 6A and 6B illustrate path control and a phase shift for beamforming in a wireless communication system according to an embodiment of the present disclosure.
Figure 6B:
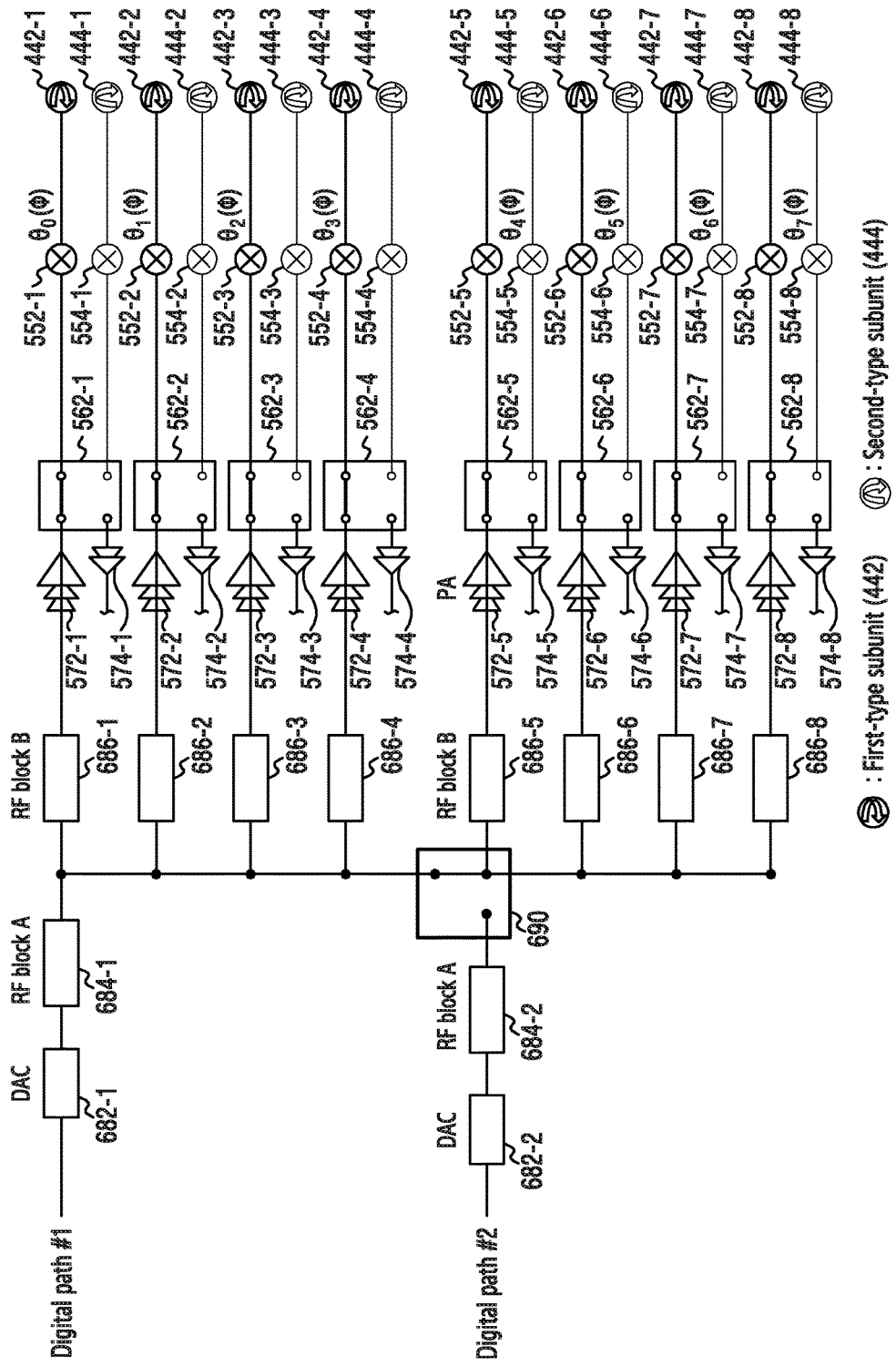

FIGS. 6A and 6B illustrate path control and a phase shift for beamforming in a wireless communication system according to an embodiment of the present disclosure. FIGS. 6A and 6B illustrate beamforming which is based on the structure illustrated in FIG. 5.

Referring to FIGS. 6A and 6B, the device includes the first-type subunits 442-1 to 442-8, the second-type subunits 444-1 to 444-8, the phase shifters 552-1 to 552-8, the phase shifters 554-1 to 554-8, the switches 562-1 to 562-8, the PAs 572-1 to 572-8, and the LNAs 574-1 to 574-8. Further, the device includes DACs 682-1 and 682-2, RF block As 684-1 and 684-2, RF block Bs 686-1 to 686-8, and a switch 690.

A combination of the RF block A 684-1 and the RF block B 686-1 configures a first RF chain for the digital path #1, and a combination of the RF block A 684-2 and the RF block B 686-2 configures a second RF chain for the digital path #2. In the present example, the RF block A 684-1 includes some of elements (e.g., a mixer, an oscillator, an amplifier, a filter, and the like) of the first RF chain, and the RF block B 686-1 includes some of the remaining elements thereof. The switch 690 controls path configuration between the digital paths #1 and #2 and at least one antenna array. The switch 690 is connected to a rear end of the RF block As 684-1 and 684-2 and to a front end of the RF block Bs 686-1 to 686-8. Alternatively, according to an embodiment of the present disclosure, the switch 690 may be connected to a front end of the RF block As 684-1 and 684-2, or may be connected to a rear end of the RF block Bs 686-1 to 686-8.

FIG. 6A illustrates a case in which two beams are formed. Referring to FIG. 6A, the switch 690 is set to connect the digital path #1 to a first antenna array, and to connect the digital path #2 to a second antenna array. At this time, different phase shift values $\theta_0(\phi_1)$ to $\theta_3(\phi_1)$ may be respectively applied to the multiple antenna elements through the phase shifters 552-1 to 552-4, so that it is possible to obtain a beamforming effect which increases the strength or gain of a signal transmitted at a particular angle $\phi_1$. The beamforming effect may also occur when a signal is received. Similarly to the first antenna array, phase shift values $\theta_0(\phi_2)$ to $\theta_3(\phi_2)$ for obtaining the beamforming effect may be applied to a signal, which is transmitted or received at a particular angle $\phi_2$, through the phase shifters 554-5 to 554-8. Accordingly, it is possible to increase the strength or gain of a transmission signal or a reception signal which is transmitted or received through the two beams.

FIG. 6B illustrates a case in which one beam is formed. Referring to FIG. 6B, the switch 690 is set to connect the digital path #1 to both the first antenna array and the second antenna array. At this time, different phase shift values $\theta_0(\phi)$ to $\theta_7(\phi)$ may be respectively applied to the multiple antenna elements through the phase shifters 552-1 to 552-8, so that it is possible to obtain a beamforming effect which increases the strength or gain of a signal transmitted at a particular angle $\phi$. At this time, in the case of FIG. 6B, use is made of more antenna elements than in the case of FIG. 6A in order to form one beam, and thus, it is possible to form a beam having a narrower beamwidth than in the case of FIG. 6A.

As illustrated in FIG. 6A, a control operation may be performed such that the first antenna array and the second antenna array have different polarization characteristics, and thereby, it is possible to form an independent channel between the antenna arrays. Through this configuration, a MIMO transmission scheme may be applied. When the antenna arrays are allowed to have different polarization characteristics, the device may form an independent channel between beams, which are formed by the antenna arrays, regardless of a physical distance between the antenna arrays. Meanwhile, as illustrated in FIG. 6B, the different antenna arrays are configured to all have an identical polarization characteristic, the subunits, that are located at the different antenna arrays but all have an identical polarization characteristic, may be all utilized, and thereby, phase shift values required to form a single beam may be applied, thus enabling the two antenna arrays to form one beam. These various configurations may be defined as different modes, and characteristics of each mode may be summarized as shown in Table 1 below.

TABLE 1

|  | Mode-1 | Mode-2 |
|---|---|---|
| MIMO order | 2 | 1 |
| Polarization characteristics of antenna arrays | different from each other | identical to each other |
| Beamwidth | relatively wide (low beamforming gain) | relatively narrow (high beamforming gain) |

Mode-1 is illustrated as an example in FIG. 1B, and mode-2 is illustrated as an example in FIG. 1A. Mode-1 has a high MIMO order, and thus is superior in capacity. On the other hand, in the case of mode-2, a beam having a narrower beamwidth may be formed, and thus, a beam gain increases. In the case of mode-2, a cell coverage increase effect can be obtained by utilizing a higher beamforming gain than in the case of mode-1.

In Table 1, mode-1 is defined as having polarization characteristics 'different from each other.' However, according to an embodiment of the present disclosure, in mode-1, polarization characteristics of antenna arrays may be set to be identical to each other. For example, when a MIMO order is equal to 2, the device may set beamforming directions to be different from each other, and thereby may set the polarization characteristics of the antenna arrays to be identical to each other.

As described above, the device may control the switches 562-1 to 562-8 illustrated in FIGS. 6A and 6B, and thereby may form beams having different polarization characteristics or may form one beam. Specifically, when an identical polarization characteristic is given to the two antenna arrays, a sharp beam may be formed by applying phase shift values to the respective antenna elements. Further, the device may control the switches 562-1 to 562-8 to accomplish switching between transmission and reception as illustrated in FIGS. 7A and 7B, to adjust a polarization characteristic of each beam as illustrated in FIGS. 8A to 8C, or to turn on/off a particular antenna element as illustrated in FIG. 9.

Figure 7A:
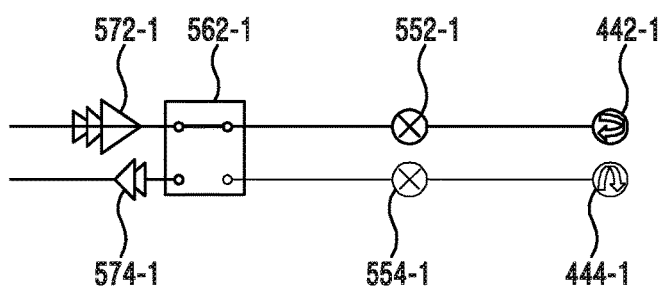
FIGS. 7A and 7B illustrate switching between transmission and reception which is accomplished by controlling a switch in a wireless communication system according to an embodiment of the present disclosure.
Figure 7B:
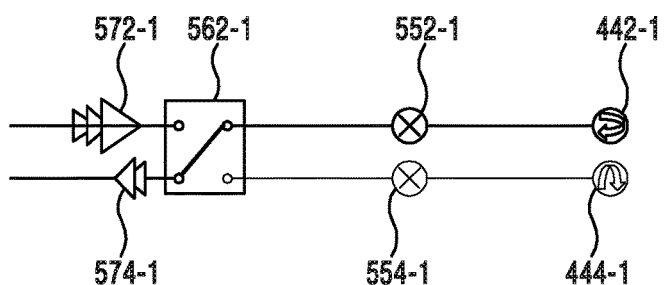

FIGS. 7A and 7B illustrate switching between transmission and reception which is accomplished by controlling a switch in a wireless communication system according to an embodiment of the present disclosure.

Referring to FIGS. 7A and 7B, the switch 562-1 may connect the first-type subunit 442-1 to a transmission path as illustrated in FIG. 7A. Accordingly, a transmission signal amplified by the PA 572-1 may pass through the phase shifter 552-1, and may be transmitted with a horizontal polarization characteristic through the first-type subunit 442-1. Alternatively, as illustrated in FIG. 7B, the switch 562-1 may connect the first-type subunit 442-1 to a reception path. Accordingly, a reception signal having a horizontal polarization characteristic received through the first-type subunit 442-1 may pass through the phase shifter 552-1, and may be amplified by the LNA 574-1.

Figure 8A:
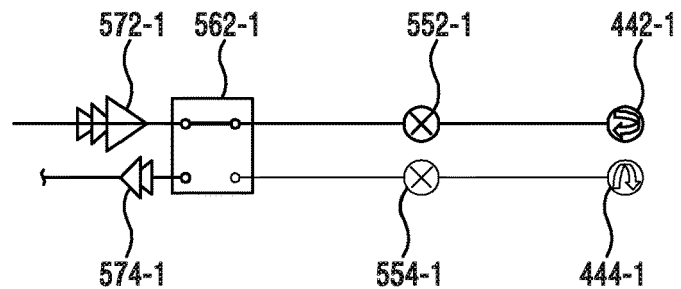
FIGS. 8A to 8C illustrate polarization conversion performed by controlling a switch in a wireless communication system according to an embodiment of the present disclosure.
Figure 8B:
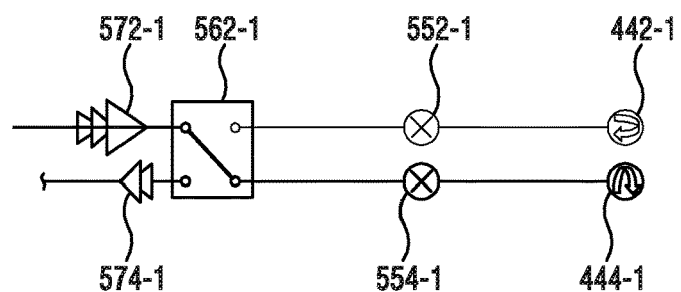
Figure 8C:
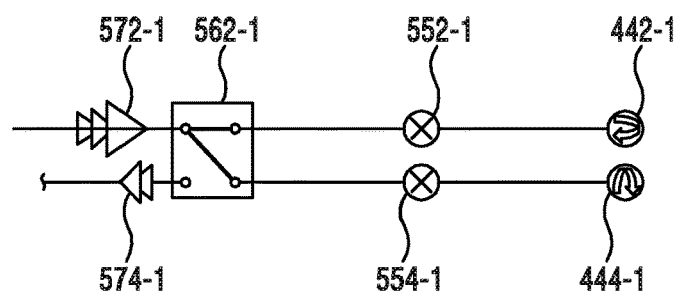
Figure 9:
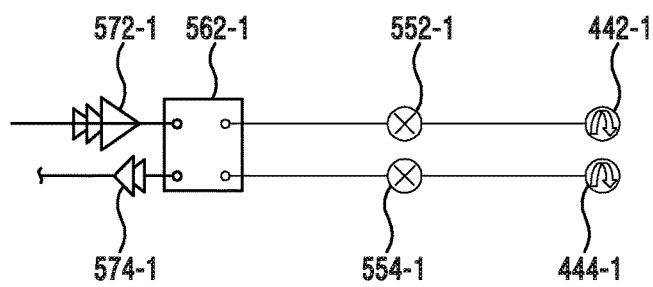
FIG. 9 illustrates a connection control between antenna elements performed by controlling a switch in a wireless communication system according to an embodiment of the present disclosure.

FIGS. 8A to 8C illustrate polarization conversion performed by controlling a switch in a wireless communication system according to an embodiment of the present disclosure.

Referring to FIGS. 8A to 8C, the switch 562-1 may connect the first-type subunit 442-1 to a transmission path as illustrated in FIG. 8A. Accordingly, a transmission signal amplified by the PA 572-1 may pass through the phase shifter 552-1 and may be transmitted with a horizontal polarization characteristic through the first-type subunit 442-1. Alternatively, as illustrated in FIG. 8B, the switch 562-1 may connect the second-type subunit 444-1 to the transmission path. Accordingly, a transmission signal amplified by the PA 572-1 may pass through the phase shifter 554-1 and may be transmitted with a vertical polarization characteristic through the second-type subunit 444-1. Alternatively, as illustrated in FIG. 8C, the switch 562-1 may connect both the first-type subunit 442-1 and the second-type subunit 444-1 to the transmission path. Accordingly, a transmission signal amplified by the PA 572-1 may pass through the phase shifter 552-1 and may be transmitted with a horizontal polarization characteristic through the first-type subunit 442-1, and simultaneously, may pass through the phase shifter 554-1 and may be transmitted with a vertical polarization characteristic through the second-type subunit 444-1. Specifically, the switch 562-1 may connect the transmission path to both the first-type subunit 442-1 and the second-type subunit 444-1, and thereby, it is possible to form a beam having dual-polarization characteristics including a vertical polarization and a horizontal polarization.

FIG. 9 illustrates a connection control between antenna elements performed by controlling a switch in a wireless communication system according to an embodiment of the present disclosure.

Referring to FIG. 9, the switch 562-1 may not connect a transmission path and a reception path to either of the first-type subunit 442-1 and the second-type subunit 444-1. In this case, an antenna element including the first-type subunit 442-1 and the second-type subunit 444-1 may enter a disabled state. When channel quality is sufficiently good or another purpose causes only some antenna elements to be used, some antenna elements may all enter a disabled state according to the control illustrated in FIG. 9.

Figure 10:
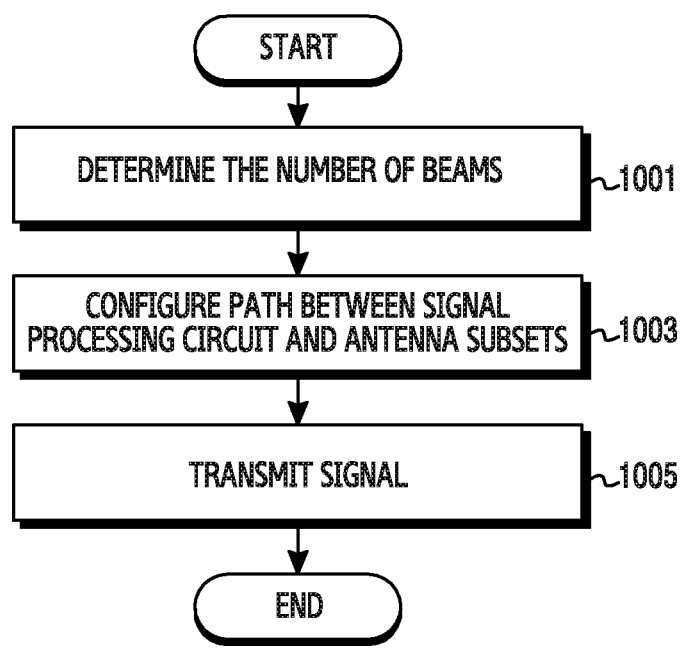
FIG. 10 is a flowchart illustrating a signal transmission procedure according to a number of beams in a wireless communication system according to an embodiment of the present disclosure.

FIG. 10 is a flowchart illustrating a signal transmission procedure according to a number of beams in a wireless communication system according to an embodiment of the present disclosure. FIG. 10 illustrates an operating method of the device 110.

Referring to FIG. 10, in operation 1001, the device 110 determines the number of beams. The number of beams may be determined based on at least one of channel quality, a carrier frequency, and a request of a counterpart device. In addition, the device 110 may further determine characteristics (e.g., beamwidth, beam power, polarization, and the like) of each beam.

In operation 1003, the device 110 configures a path between a signal processing circuit and antenna subsets. Specifically, the device 110 divides multiple antenna arrays into at least one antenna subset, and configures the path so as to provide each antenna subset with a transmission signal to be transmitted through each beam. For example, the device 110 may control at least one switch to configure the path. In the present example, one antenna subset includes at least one antenna array.

In operation 1005, the device 110 transmits a signal. At this time, as many beams as the number of beams determined in operation 1001 may be formed according to the configuration of the path in operation 1003. To this end, the device 110 may apply phase shift values to signals transmitted through the respective antenna subsets. In other words, the device 110 may multiply the signals, which are transmitted through the respective antenna subsets, with the phase shift values. The phase shift values may be referred to as a "phase vector," a "beamforming vector," an "analog precoder," an "analog precoding vector," and the like.

Typically, in the case of designing an antenna array, the frequency of transmission and reception signals affects a distance between antenna elements. Accordingly, when a physical aspect of an antenna array is determined, an optimal frequency is determined. However, the device according to an embodiment of the present disclosure may adjust a distance between antenna elements according to a carrier frequency by using the above-described structure of the antenna array.

Figure 11A:
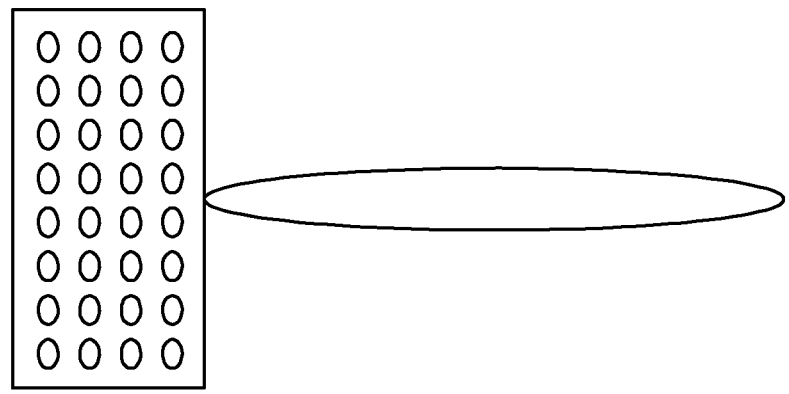
FIGS. 11A and 11B illustrate a beam change according to an adjustment of a distance between antenna elements in a wireless communication system according to an embodiment of the present disclosure.
Figure 11B:
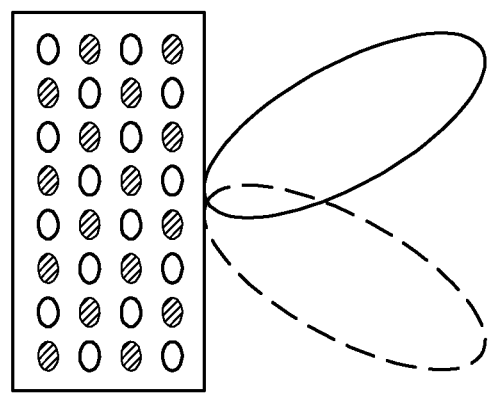

FIGS. 11A and 11B illustrate a beam change according to an adjustment of a distance between antenna elements in a wireless communication system according to an embodiment of the present disclosure. FIGS. 11A and 11B illustrate an antenna control according to a scalable carrier frequency. FIG. 11A illustrates an example of a case in which use is made of a carrier frequency corresponding to a distance between disposed antenna elements, and FIG. 11B illustrates a case in which use is made of a carrier frequency corresponding to a distance twice a distance between disposed antenna elements. For example, a distance twice the distance may correspond to one-half of the carrier frequency. Specifically, FIG. 11A may correspond to a case in which a carrier frequency is equal to 60 GHz, and FIG. 11B may correspond to a case in which the carrier frequency is equal to 30 GHz.

Referring to FIG. 11A, all of the antenna elements form one beam. When channel quality is better than or equal to a required level, the device may disable some antenna elements, and thereby can reduce consumed power. Referring to FIG. 11B, one-half of the antenna elements form one beam, and the remaining one-half thereof form the other beam. At this time, the one-half of the antenna elements include antenna elements arranged with a distance twice the distance between the disposed antenna elements in such a manner as to alternately skip the disposed antenna elements without including adjacent antenna elements. At this time, two beams may be controlled to have different polarization characteristics. When channel quality is better than or equal to a required level, the device may disable some antenna elements, and thereby can reduce consumed power. At this time, the device may enable the two beams and may operate, or may enable only one beam and may operate. The path control for beamforming as illustrated in FIG. 11A is as illustrated in FIG. 12A, and the path control for beamforming as illustrated in FIG. 11B is as illustrated in FIG. 12B.

Figure 12A:
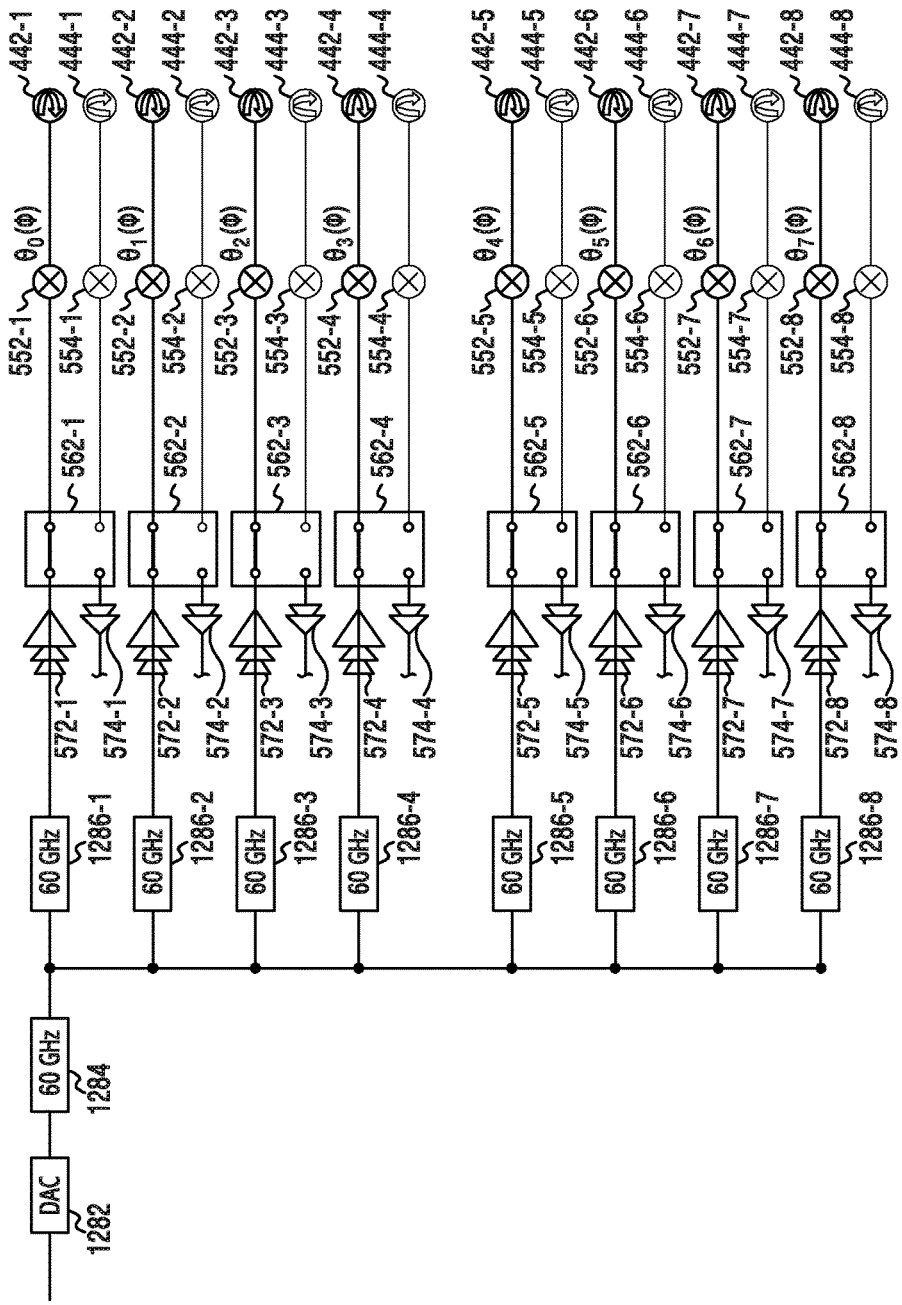
FIGS. 12A and 12B illustrate path control according to a frequency in a wireless communication system according to an embodiment of the present disclosure.
Figure 12B:
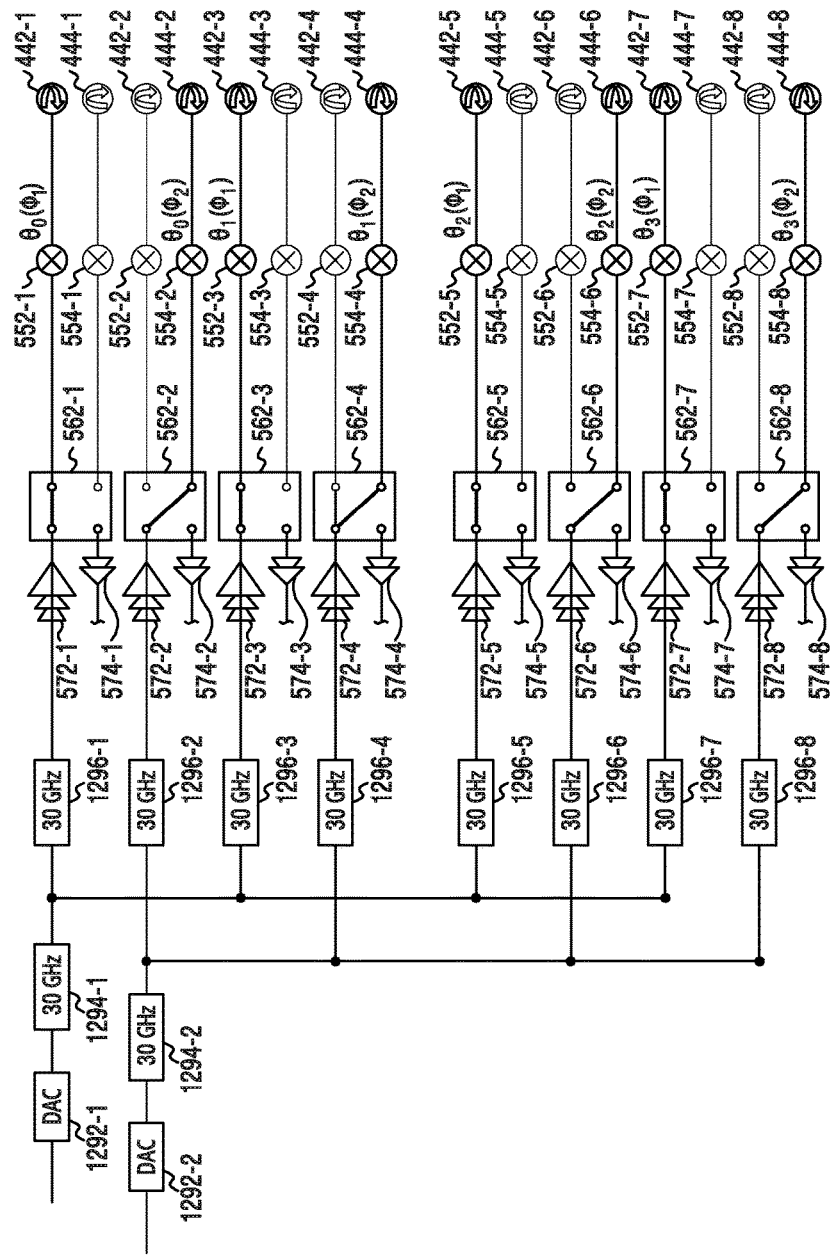

FIGS. 12A and 12B illustrate path control according to a frequency in a wireless communication system according to an embodiment of the present disclosure. FIGS. 12A and 12B illustrate a case in which the number of antenna elements used for one beam and a distance between the antenna elements depend on a change in a carrier frequency.

FIG. 12A illustrates a case in which a carrier frequency is equal to 60 GHz.

Referring to FIG. 12A, a device includes first-type subunits 442-1 to 442-8 all having a horizontal polarization characteristic, second-type subunits 444-1 to 444-8 all having a vertical polarization characteristic, phase shifters 552-1 to 552-8 respectively corresponding to the first-type subunits 442-1 to 442-8, phase shifters 554-1 to 554-8 respectively corresponding to the second-type subunits 444-1 to 444-8, the switches 562-1 to 562-8, the PAs 572-1 to 572-8, the LNAs 574-1 to 574-8, a DAC 1282, an RF block A 1284 for 60 GHz, and RF block Bs 1286-1 to 1286-8 for 60 GHz. As illustrated in FIG. 12A, a transmission signal may be processed by the RF block A 1284 for 60 GHz and the RF block Bs 1286-1 to 1286-8 for 60 GHz, different phase shift values $\theta_0(\phi)$ to $\theta_7(\phi)$ may be applied to multiple antennas elements, and thereby, directivity may be given to a beam.

FIG. 12B illustrates a case in which a carrier frequency is equal to 30 GHz.

Referring to FIG. 12B, a device includes first-type subunits 442-1 to 442-8 all having a horizontal polarization characteristic, second-type subunits 444-1 to 444-8 all having a vertical polarization characteristic, phase shifters 552-1 to 552-8 respectively corresponding to the first-type subunits 442-1 to 442-8, phase shifters 554-1 to 554-8 respectively corresponding to the second-type subunits 444-1 to 444-8, the switches 562-1 to 562-8, the PAs 572-1 to 572-8, the LNAs 574-1 to 574-8, DACs 1292-1 and 1292-2, RF block As 1294-1 and 1294-2 for 30 GHz, and RF block Bs 1296-1 to 1296-8 for 30 GHz. As illustrated in FIG. 12B, one transmission signal is processed by the RF blocks for 30 GHz 1294-1, 1296-1, 1296-3, 1296-5, and 1296-7, different phase shift values $\theta_0(\phi_1)$ to $\theta_3(\phi_1)$ are applied to multiple antennas elements, and thereby, one beam is formed. The other transmission signal is processed by the RF blocks for 30 GHz 1294-2, 1296-2, 1296-4, 1296-6, and 1296-8, different phase shift values $\theta_0(\phi_2)$ to $\theta_3(\phi_2)$ are applied to multiple antennas elements, and thereby, the other beam is formed. Specifically, as illustrated in FIG. 12B, a beam may be formed through an antenna subset obtained by combining antenna elements included in different antenna arrays.

As illustrated in FIGS. 12A and 12B, an antenna subset may be configured according to a carrier frequency. At least one switch may be further included in order to adaptively configure a path as illustrated in FIGS. 12A and 12B. Specifically, FIGS. 12A and 12B illustrate an equivalent connection structure, and it is apparent from each of FIGS. 12A and 12B that a description of the at least one switch for configuring a path has been omitted for convenience of description.

Figure 13:
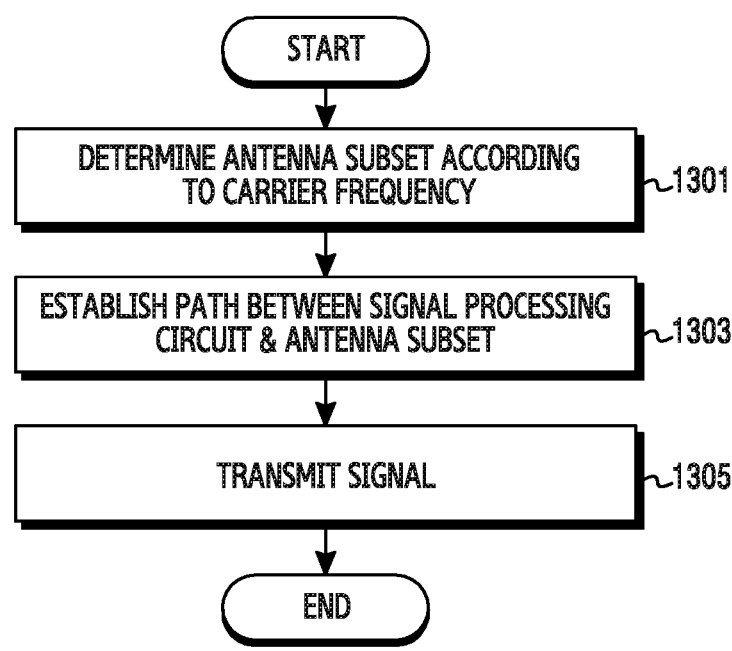
FIG. 13 is a flowchart illustrating a signal transmission procedure according to a frequency in a wireless communication system according to an embodiment of the present disclosure.

FIG. 13 is a flowchart illustrating a signal transmission procedure according to a frequency in a wireless communication system according to an embodiment of the present disclosure. FIG. 13 illustrates an operating method of the device 110.

Referring to FIG. 13, in operation 1301, the device 110 determines an antenna subset according to a carrier frequency. In other words, the device 110 determines a distance between antenna elements based on the carrier frequency, and determines at least one antenna subset obtained by combining antenna elements satisfying the determined distance. Accordingly, the at least one antenna subset including antenna elements belonging to different antenna arrays may be determined.

In operation 1303, the device 110 configures a path between a signal processing circuit and the antenna subset. Specifically, the device 110 configures the path so as to provide each antenna subset with a transmission signal to be transmitted through each beam. For example, the device 110 may control at least one switch to configure the path. In the present example, one antenna subset includes at least one antenna array.

In operation 1305, the device 110 transmits a signal. At this time, as many beams as the number of beams determined in operation 1301 may be formed according to the configuration of the path in operation 1303. To this end, the device 110 may apply phase shift values to signals transmitted through the respective antenna subsets, and thereby may perform beamforming. In other words, the device 110 may multiply the signals, which are transmitted through the respective antenna subsets, with the phase shift values. The phase shift values may be referred to as a "phase vector," a "beamforming vector," an "analog precoder," an "analog precoding vector," and the like.

As described above, the device according to an embodiment of the present disclosure may perform path control over the antenna arrays and the antenna elements, and thereby may perform various forms of beamforming. Accordingly, the device may adaptively perform beamforming according to a communication environment. Further, the device may perform more efficient beam search by using adaptive beamforming. For example, when two devices communicate with each other, beam search may be performed according to the standard shown in Table 2 below.

TABLE 2

| | Device A | Device B (in the case of group 1) | Device B (in the case of group 2) | Device B (in the case of group 3) |
|---|---|---|---|---|
| A→B | mode-1 | mode-1 | mode-1 | mode-1 |
| B→A | mode-1 | mode-1 | | |
| | mode-1 | | mode-2 | |
| | mode-2 | | | mode-2 |

In Table 2, A→B signifies a link from the device A to the device B, and B→A signifies a link from the device B to the device A. When the device A is a base station and the device B is a terminal, A→B signifies downlink, and B→A signifies uplink. In Table 2, mode-1 and mode-2 are modes described in Table 1, and mode-1 is a state of using a MIMO order of 2 and a relatively wide beam, and mode-2 is a state of using a MIMO order of 1 and a relatively narrow beam.

The execution of beam search according to the standard shown in Table 2 may cause a specific procedure for beam search to be different for each group. Although not shown in Table 2, beam search, which causes the device A to operate in mode-2 and causes the device B to operate in mode-1, may be performed. For example, the beam search may be performed as illustrated in FIG. 14.

Figure 14:
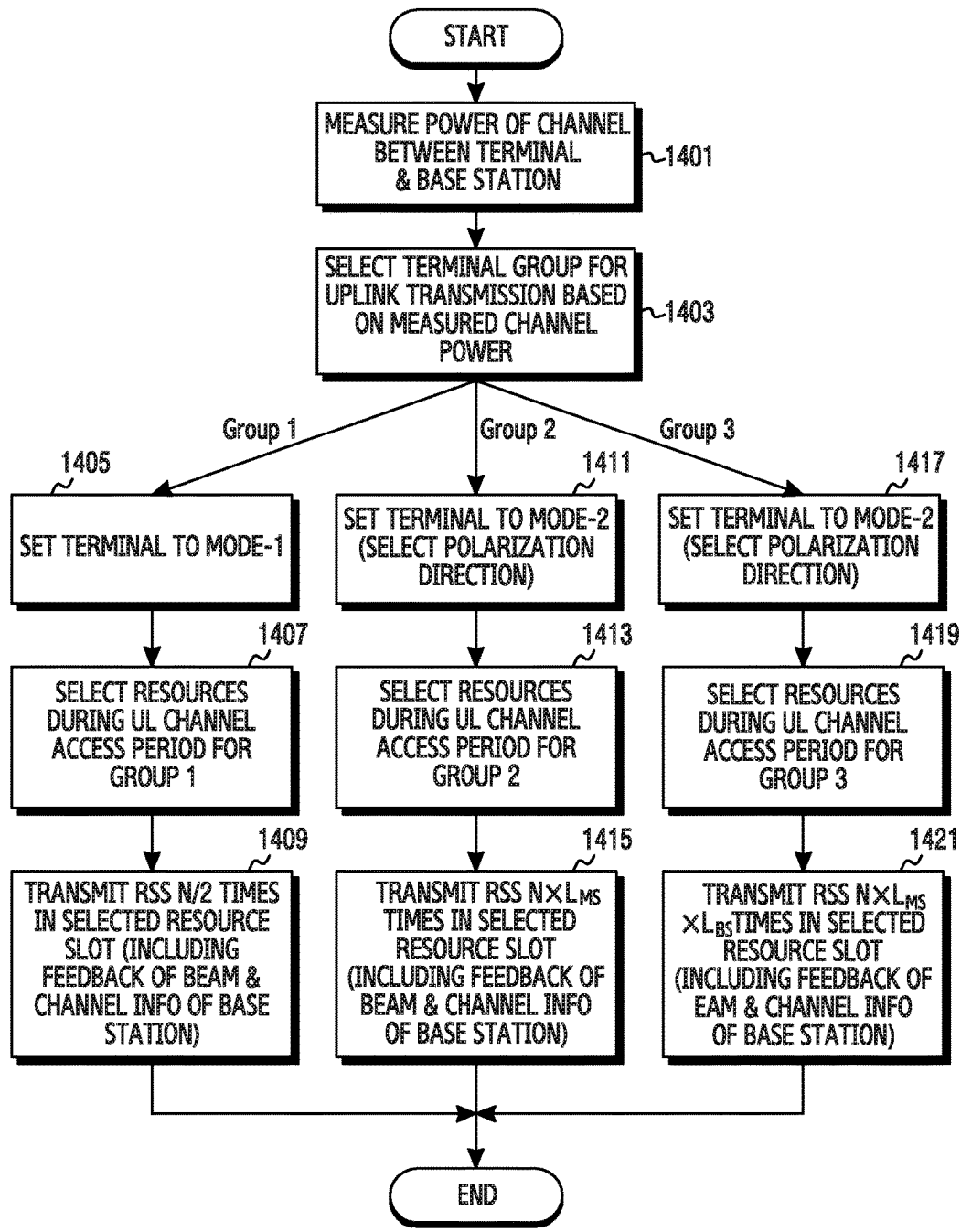
FIG. 14 is a flowchart illustrating a beam search procedure in a wireless communication system according to an embodiment of the present disclosure.

FIG. 14 is a flowchart illustrating a beam search procedure in a wireless communication system according to an embodiment of the present disclosure. FIG. 14 illustrates an example in which a base station serves as a device that controls the beam search procedure and a terminal serves as another device that participates in the beam search procedure. However, the procedure illustrated in FIG. 14 may also be applied to one terminal and other multiple terminals. A terminal that performs the procedure illustrated in FIG. 14 may be the device 110.

Referring to FIG. 14, in operation 1401, the terminal measures channel power of a channel between the terminal and the base station. At this time, the terminal operates in mode-1 or mode-2. The terminal determines an optimal beam direction for the base station together with the measurement of the channel power. Specifically, the terminal sweeps available beam directions through reception beams, and identifies the largest channel power value among channel power values measured in the respective beam directions. The channel power may be replaced by signal strength, channel quality, and the like. Specifically, the terminal may measure the channel power by using a signal having a pre-agreed value. For example, the signal may include at least one of a reference signal, a synchronization signal, a preamble, a beacon signal, and a pilot signal.

In operation 1403, the terminal selects a terminal group for uplink transmission based on the measured channel power. For example, the terminal groups may be classified into group 1, group 2, and group 3. A corresponding relationship between the channel power and each group may be predefined. For example, two thresholds for determining the corresponding relationship may be predefined. In this case, group 1 may be selected when the channel power exceeds the first threshold, group 2 may be selected when the channel power is less than or equal to the first threshold and exceeds the second threshold, and group 3 may be selected when the channel power is less than or equal to the second threshold. As another example, the terminal may select one of group 1, group 2, and group 3 according to the standard shown in Table 3 below.

TABLE 3

| Group | Condition |
|---|---|
| group 1 | $P_{ref} - P_{offset} - P_{mode} > P_{threshold}$ |
| group 2 | $P_{ref} - P_{offset} + 6 - P_{mode} > P_{threshold}$ |
| group 3 | $P_{ref} - P_{offset} + 12 - P_{mode} > P_{threshold}$ |

In Table 3, $P_{ref}$ represents a power strength of a downlink signal from the base station which is measured by the terminal, $P_{offset}$ represents a difference (e.g., 12 dB) in capability of a power amplifier between the terminal and the base station, $P_{mode}$ represents an offset corresponding to a mode used when power of the downlink signal is measured, and $P_{threshold}$ represents minimum signal power required to receive a reference signal. For example, $P_{mode}$ may be 0 dB when mode-1 is used during the measurement of power of the downlink signal. Alternatively, $P_{mode}$ may be 6 dB when mode-2 is used during the measurement of power of the downlink signal. $P_{offset}$ may be provided from the base station to the terminal through a control signal separately from this procedure. Specifically, the terminal may receive control information notifying of a difference in capability of a power amplifier between the terminal and the base station, or may receive control information notifying of the capability of the power amplifier of the base station, and may calculate $P_{mode}$.

If group 1 has been selected in operation 1403, the terminal proceeds to operation 1405 and selects mode-1. In other words, the terminal operates in a mode which allows multiple beams to be simultaneously formed. To this end, the terminal configures multiple antenna subsets, and configures a path so as to provide different transmission signals to the respective antenna subsets. For example, the terminal may control a path as illustrated in FIG. 6A.

In operation 1407, the terminal selects resources during an uplink channel access period for group 1. For example, the terminal optionally selects one of resource slots for random access (RA) in the uplink channel access period. Alternatively, the terminal may be allocated resources, which are allocated to a service period (SP), by the base station in the uplink channel access period. Alternatively, the terminal may select resources regardless of use. In the present example, the channel access period may be referred to as a "feedback resource period."

In operation 1409, the terminal transmits reference signals N/2 times in the selected resource slot. In the present example, N represents the number of beam directions of the base station. In other words, the terminal transmits reference signals in the optimal beam direction, and simultaneously uses a beam having a horizontal polarization characteristic and a beam having a vertical polarization characteristic. At this time, the terminal may transmit beam and channel information of the base station together with the reference signals. For example, the reference signal and the beam and channel information of the base station may be transmitted as one packet. Alternatively, the terminal may transmit the beam and channel information of the base station separately from the transmission of the reference signal. At this time, the base station operates in mode-1, sweeps one-half of all of the beam directions through reception beams all having the horizontal polarization characteristic, and sweeps the remaining one-half thereof through reception beams all having the vertical polarization characteristic. Accordingly, the base station may determine an optimal beam direction for the terminal.

If group 2 has been selected in operation 1403, the terminal proceeds to operation 1411 and selects mode-2. In other words, the terminal operates in a mode which allows one beam to be formed. To this end, the terminal configures all or some of the antenna elements as one antenna subset, and configures a path so as to provide one transmission signal to the antenna subset. For example, the terminal may control a path as illustrated in FIG. 6B. At this time, the terminal determines a polarization characteristic to be used. For example, when the multiple polarizations are used during the measurement of the channel power, the terminal may select a polarization, of which a relatively large power value has been measured.

In operation 1413, the terminal selects resources during an uplink channel access period for group 2. For example, the terminal optionally selects one of resource slots for RA in the uplink channel access period. Alternatively, the terminal may be allocated resources, which are designated for an SP, by the base station in the uplink channel access period. Alternatively, the terminal may select resources regardless of use.

The terminal proceeds to operation 1415 and transmits reference signals $N \times L_{MS}$ times in the selected resource slot. In the present example, N represents the number of directions of wide beams of the base station, and $L_{MS}$ is a parameter which is based on a difference in beamwidth between a wide beam of the terminal and a narrow beam thereof, and represents the number of narrow beams corresponding to one wide beam. Specifically, the terminal may operate in mode-2, and thereby may transmit the reference signals through a narrower beam than when the channel power is measured. Accordingly, in order to sweep a range of an optimal beam direction selected by using a wide beam, the terminal needs to transmit the reference signals by the number of times of transmission which is greater than when the wide beam is used. In other words, the terminal transmits the reference signals in the range of the optimal beam direction, and uses either of a beam having a horizontal polarization characteristic and a beam having a vertical polarization characteristic. At this time, the terminal may transmit beam and channel information of the base station together with the reference signals. For example, the reference signal and the beam and channel information of the base station may be transmitted as one packet. Alternatively, the terminal may transmit the beam and channel information of the base station separately from the transmission of the reference signal. At this time, the base station operates in mode-1, and sweeps all of the beam directions by using both reception beams all having the horizontal polarization characteristic and reception beams all having the vertical polarization characteristic. Accordingly, the base station may determine an optimal beam direction for the terminal.

If group 3 has been selected in operation 1403, the terminal proceeds to operation 1417 and selects mode-2. In other words, the terminal operates in a mode which allows one beam to be formed. To this end, the terminal configures all or some of the antenna elements as one antenna subset, and configures a path so as to provide one transmission signal to the antenna subset. For example, the terminal may control a path as illustrated in FIG. 6B. At this time, the terminal determines a polarization characteristic to be used. For example, when the multiple polarizations are used during the measurement of the channel power of the downlink channel between the terminal and the base station, the terminal may select a polarization, of which a relatively large power value has been measured.

In operation 1419, the terminal selects resources during an uplink channel access period for group 3. For example, the terminal optionally selects one of resource slots for RA in the uplink channel access period. Alternatively, the terminal may be allocated resources, which are designated for an SP, by the base station in the uplink channel access period. Alternatively, the terminal may select resources regardless of use.

The terminal proceeds to operation 1421 and transmits reference signals N×$L_{MS}$×$L_{BS}$ times in the selected resource slot. In the present example, N represents the number of directions of wide beams of the base station; $L_{MS}$ is a parameter which is based on a difference in beamwidth between a wide beam of the terminal and a narrow beam thereof, and represents the number of narrow beams corresponding to one wide beam; and $L_{BS}$ is a parameter which is based on a difference in beamwidth between a wide beam of the base station and a narrow beam thereof, and represents the number of narrow beams corresponding to one wide beam. In other words, the terminal transmits the reference signals by using narrow beams of different directions in the range of the optimal beam direction, and uses either of a beam having a horizontal polarization characteristic and a beam having a vertical polarization characteristic. At this time, the terminal may transmit beam and channel information of the base station together with the reference signals. For example, the reference signal and the beam and channel information of the base station may be transmitted as one packet. Alternatively, the terminal may transmit the beam and channel information of the base station separately from the transmission of the reference signal. At this time, the base station operates in mode-1, and sweeps all of the beam directions by using both reception beams all having the horizontal polarization characteristic and reception beams all having the vertical polarization characteristic. However, differently from operation 1415, the base station forms both the reception beams all having the horizontal polarization characteristic and the reception beams all having the vertical polarization characteristic through all of the antenna elements. Specifically, the base station forms beams having dual-polarization characteristics. Accordingly, the base station may determine an optimal beam direction for the terminal.

In the embodiment of the present disclosure as described with reference to FIG. 14, modes of the base station and the terminal, and overhead for beam search are summarized as shown in Table 4 below.

TABLE 4

| Link | Base station mode | Terminal mode | Required amount of resources for beam search | Received signal strength [dB] |
|---|---|---|---|---|
| downlink | mode-1 | mode-1 | N × M | $P_{ref}$ |
| uplink | mode-1 | mode-1 | N/2 × $K_{Group-1}$ × (1 + $Pr_{RA}$) | $P_{ref} - P_{offset}$ |
|  | mode-1 | mode-2 | N/2 × $L_{MS}$ × $K_{Group-2}$ × (1 + $Pr_{RA}$) | $P_{ref} - P_{offset} + 6$ |
|  | mode-2 | mode-2 | N/2 × $L_{MS}$ × $L_{BS}$ × $K_{Group-3}$ × (1 + $Pr_{RA}$) | $P_{ref} - P_{offset} + 12$ |

In Table 4, N represents the number of beam directions of the base station, M represents the number of beam directions of the terminal, $K_{Group-1}$ represents the number of terminals belonging to group 1, $K_{Group-2}$ represents the number of terminals belonging to group 2, $K_{Group-3}$ represents the number of terminals belonging to group 3, $L_{MS}$ represents the number of narrow beams corresponding to one wide beam of the terminal, $L_{BS}$ represents the number of narrow beams corresponding to one wide beam of the base station, and $Pr_{RA}$ represents the probability of attempting RA by the terminal that initially accesses.

Hereinafter, various examples of the above-described beam search procedure will be described with reference to specific embodiments of the present disclosure as illustrated in FIGS. 15A and 15B, 16A to 16C, 17A to 17C, 18A to 18C, 19A to 19C, and 20A to 20C. In FIGS. 15 and 15B, 16A to 16C, 17A to 17C, 18A to 18C, 19A to 19C, and 20A to 20C, a device A 110-1 is a node that controls the beam search procedure. For example, the device A 110-1 may be a base station, and a device B 110-2 may be a terminal. Hereinafter, FIGS. 15A and 15B, 16A to 16C, 17A to 17C, 18A to 18C, 19A to 19C, and 20A to 20C illustrate a situation in which a horizontal polarization is selected when the device B 110-2 uses one polarization. However, a vertical polarization may be selected according to a channel environment.

Figure 15A:
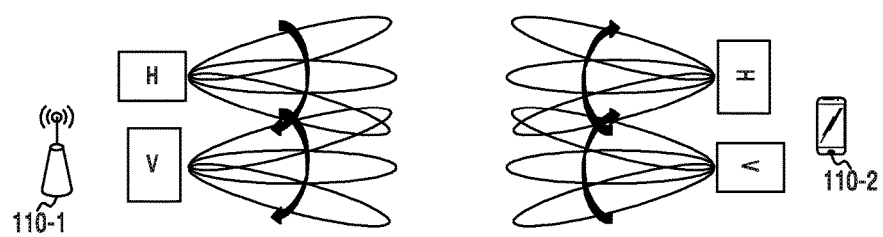
FIGS. 15A and 15B illustrate beam sweeping in a wireless communication system according to an embodiment of the present disclosure.
Figure 15B:
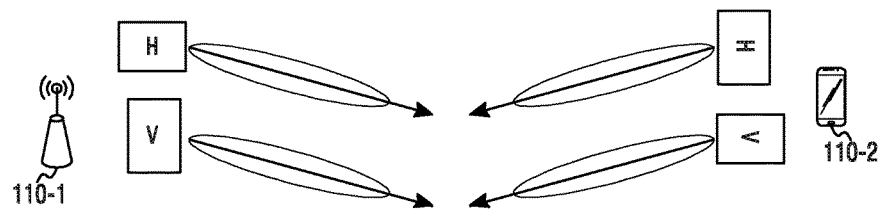

FIGS. 15A and 15B illustrate beam sweeping in a wireless communication system according to an embodiment of the present disclosure. FIGS. 15A and 15B illustrate the determination of optimal beam directions through beam sweeping.

Referring to FIG. 15A, the device A 110-1 and the device B 110-2 simultaneously form two beams having different polarization characteristics. The device A 110-1 and the device B 110-2 sweep all of the beam directions through the beams having the different polarization characteristics. At this time, the device A 110-1 may transmit reference signals, and the device B 110-2 may measure a signal strength. In order to identify combinations of all of the beam directions, it is required to transmit reference signals M×N times wherein M×N is obtained by multiplying the number N of beam directions of the device A 110-1 by the number M of beam directions of the device B 110-2. At this time, the number of beam directions, that the device B 110-2 is capable of using, may be greater than the number of reference signals capable of being transmitted during one search period. In this case, the device B 110-2 may selectively sweep some beam directions during the one search period. FIG. 15A may be understood as an example of operation 1401 illustrated in FIG. 14.

Through the beam sweeping illustrated in FIG. 15A, the device B 110-2 may recognize channel characteristics of various beam combinations, and may select an optimal beam index. In the present example, the beam index includes at least one of a transmission beam index of the device A 110-1 and a reception beam index of the device B 110-2. The device B 110-2 may feed back, to the device A 110-1, information on the selected beam index and channel quality information on a case of using the selected beam index. At this time, a mode required to transmit and receive feedback information may be changed according to a channel state between the device A 110-1 and the device B 110-2.

In FIG. 15A, the device A 110-1 divides the antenna arrays into two antenna subsets, and forms different beams through the respective antenna subsets. This configuration considers that transmission power of the device A 110-1 is sufficiently large and reference signals reach devices located at a cell boundary even when the device A 110-1 operates in mode-1. Therefore, according to an embodiment of the present disclosure, the device A 110-1 may transmit the reference signals through one beam having a narrower beamwidth. In this case, the number of times of transmission of the reference signals may further increase.

In FIG. 15B, a situation is illustrated in which an optimal beam direction for the device A 110-1 and an optimal beam direction for the device B 110-2 are determined. Accordingly, channel information considering polarization characteristics described below may be determined.

$$\begin{bmatrix} C_{11} & C_{12} \\ C_{21} & C_{22} \end{bmatrix} \quad \text{Equation 1}$$

In Equation 1, $C_{11}$ represents a channel value between a horizontal polarization beam of the device A 110-1 and a horizontal polarization beam of the device B 110-2, $C_{12}$ represents a channel value between a vertical polarization beam of the device A 110-1 and a horizontal polarization beam of the device B 110-2, $C_{21}$ represents a channel value between a horizontal polarization beam of the device A 110-1 and a vertical polarization beam of the device B 110-2, and $C_{22}$ represents a channel value between a vertical polarization beam of the device A 110-1 and a vertical polarization beam of the device B 110-2.

Figure 16A:
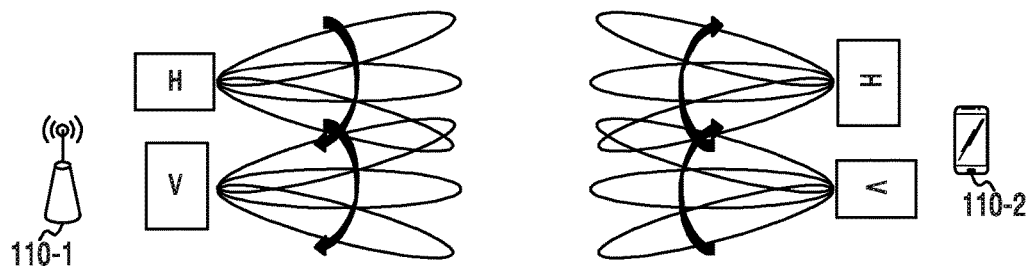
FIGS. 16A to 16C illustrate a beam search procedure for a device belonging to group 1 in a wireless communication system according to an embodiment of the present disclosure.
Figure 16B:
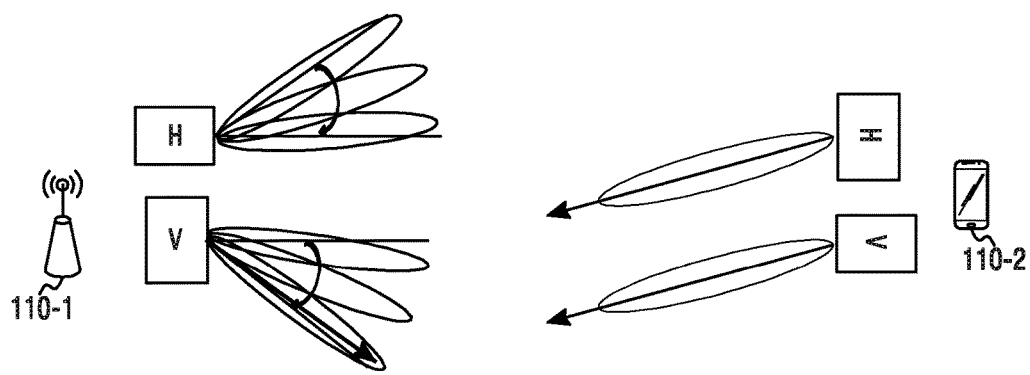
Figure 16C:
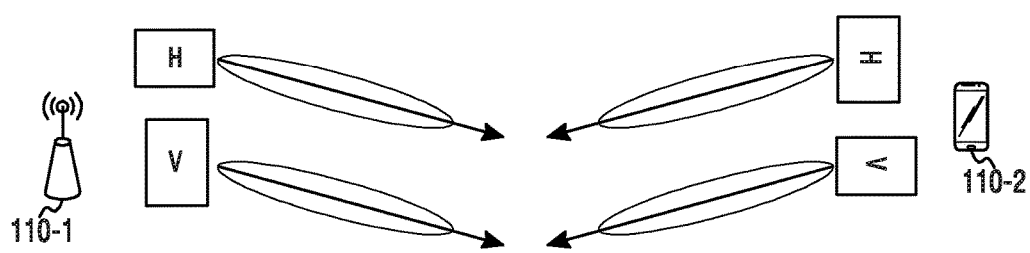

FIGS. 16A to 16C illustrate a beam search procedure for a device belonging to group 1 in a wireless communication system according to an embodiment of the present disclosure. FIG. 16A may be understood as corresponding to operation 1401 illustrated in FIG. 14, and FIG. 16B may be understood as corresponding to operation 1409 illustrated in FIG. 14.

Referring to FIG. 16A, the device A 110-1 and the device B 110-2 simultaneously form two beams having different polarization characteristics. The device A 110-1 and the device B 110-2 sweep all of the beam directions through the beams having the different polarization characteristics. At this time, the device A 110-1 may transmit reference signals, and the device B 110-2 may measure a signal strength. In order to identify combinations of all of the beam directions, it is required to transmit reference signals M×N times wherein M×N is obtained by multiplying the number N of beam directions of the device A 110-1 by the number M of beam directions of the device B 110-2. Accordingly, the device B 110-2 may measure signal strengths or channel qualities of multiple beam direction combinations, and may determine that a reception beam direction belonging to a beam direction combination corresponding to the maximum signal strength is an optimal beam direction for the device A 110-1. Further, the device B 110-2 may determine an optimal transmission beam direction for the device A 110-1 over the device B 110-2.

Referring to FIG. 16B, the device B 110-2 transmits reference signals in the optimal beam direction. At this time, the device B 110-2 transmits the reference signals through both a beam having a horizontal polarization characteristic and a beam having a vertical polarization characteristic. In response, the device A 110-1 forms reception beams having different polarization characteristics, sweeps one-half of all of the beam directions through reception beams all having the horizontal polarization characteristic, and sweeps the remaining one-half thereof through reception beams all having the vertical polarization characteristic. Accordingly, in order to allow the device A 110-1 to sweep all of the beam directions, it is required to transmit reference signals N/2 times. In the present example, N represents the number of beam directions of the device A 110-1. Accordingly, the device A 110-1 may measure signal strengths or channel qualities of multiple beam direction combinations, and may determine that a reception beam direction belonging to a beam direction combination corresponding to the maximum signal strength is an optimal beam direction for the device A 110-1.

In the procedure illustrated in FIG. 16B, the device B 110-2 may transmit, to the device A 110-1, feedback information including a beam index, channel quality information, and the like. Specifically, the device B 110-2 has determined the optimal beam direction through the procedure illustrated in FIG. 16A, and thus may transmit the feedback information through an optimal beam. The device A 110-1 does not know a beam direction in which the device A 110-1 is to receive the feedback information, and thus sweeps multiple beam directions as illustrated in FIG. 16B. At this time, a signal, that the device B 110-2 has transmitted through any one antenna array, namely, a signal transmitted with any one polarization characteristic, may be received with good quality through at least one of the antenna arrays included in the device A 110-1. Specifically, the determination of an optimal beam direction by the device A 110-1 and the reception of the feedback information by the device A 110-1, which use the reference signal, may be simultaneously performed in one procedure.

Referring to FIG. 16C, the device A 110-1 and the device B 110-2 perform data communication with each other in optimal beam directions. At this time, the device A 110-1 and the device B 110-2 may perform spatial multiplexing transmission through multiple beams. In other words, the device A 110-1 and the device B 110-2 may simultaneously transmit multiple streams. Alternatively, the device A 110-1 and the device B 110-2 may perform diversity transmission through the multiple beams. In other words, the device A 110-1 and the device B 110-2 may transmit one stream through the multiple beams in an overlapping manner.

Figure 17A:
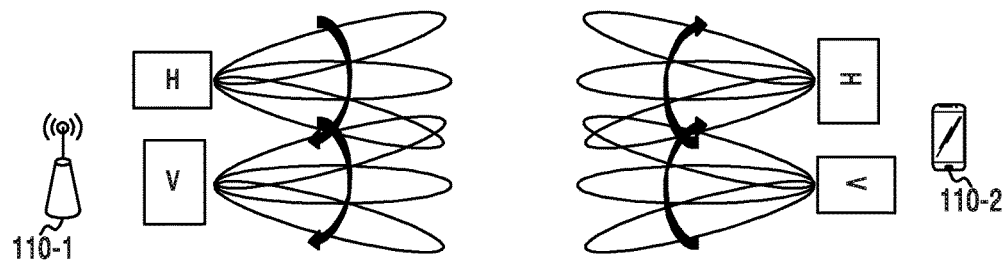
FIGS. 17A to 17C illustrate a beam search procedure for a device belonging to group 2 in a wireless communication system according to an embodiment of the present disclosure.
Figure 17B:
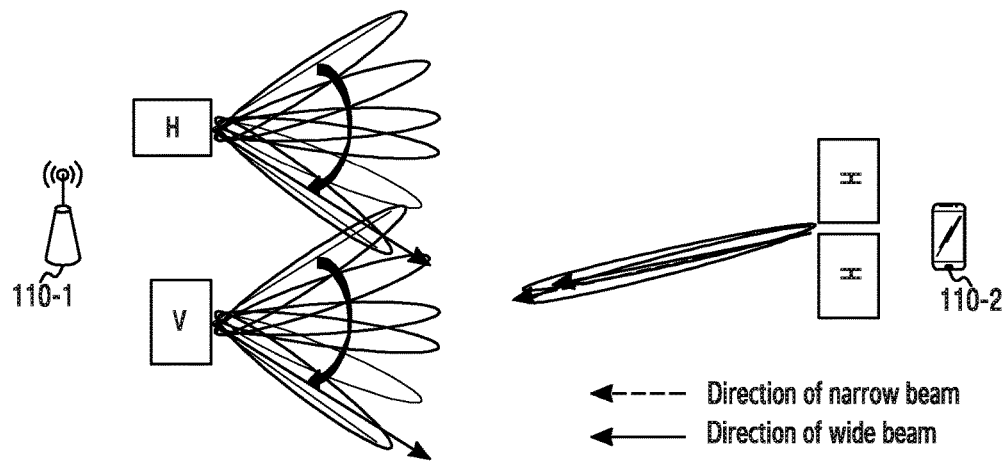
Figure 17C:
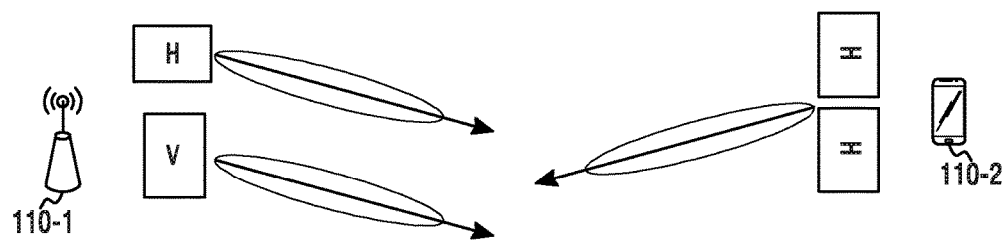

FIGS. 17A to 17C illustrate a beam search procedure for a device belonging to group 2 in a wireless communication system according to an embodiment of the present disclosure. FIG. 17A may be understood as corresponding to operation 1401 illustrated in FIG. 14, and FIG. 17B may be understood as corresponding to operation 1415 illustrated in FIG. 14.

Referring to FIG. 17A, the device A 110-1 and the device B 110-2 simultaneously form two beams having different polarization characteristics. The device A 110-1 and the device B 110-2 sweep all of the beam directions through the beams having the different polarization characteristics. At this time, the device A 110-1 may transmit reference signals, and the device B 110-2 may measure a signal strength. In order to identify combinations of all of the beam directions, it is required to transmit reference signals M×N times wherein M×N is obtained by multiplying the number N of beam directions of the device A 110-1 by the number M of beam directions of the device B 110-2. Accordingly, the device B 110-2 may measure signal strengths or channel qualities of multiple beam direction combinations, and may determine that a reception beam direction belonging to a beam direction combination corresponding to the maximum signal strength is an optimal beam direction for the device A 110-1. Further, the device B 110-2 may determine an optimal transmission beam direction for the device A 110-1 over the device B 110-2.

Referring to FIG. 17B, the device B 110-2 transmits reference signals in the optimal beam direction. At this time, the device B 110-2 transmits the reference signals through either of a beam having a horizontal polarization characteristic and a beam having a vertical polarization characteristic. Specifically, the device B 110-2 uses a narrower beam than in the case of FIG. 17A, and accordingly, sweeps a range of an optimal beam direction, which has been selected with the wide beam as a reference, through the narrow beam. In response, the device A 110-1 sweeps all of the beam directions by using both a reception beam having the horizontal polarization characteristic and a reception beam having the vertical polarization characteristic. In this case, in order to identify combinations of all of the beam directions, it is required to transmit reference signals N×$L_{MS}$ times. In the present example, N represents the number of directions of wide beams of the device A 110-1, and $L_{MS}$ represents the number of narrow beams corresponding to one wide beam of the device B 110-2. Accordingly, the device A 110-1 may measure signal strengths or channel qualities of multiple beam direction combinations, and may determine that a reception beam direction belonging to a beam direction combination corresponding to the maximum signal strength is an optimal beam direction for the device A 110-1.

In the procedure illustrated in FIG. 17B, the device B 110-2 may transmit, to the device A 110-1, feedback information including a beam index, channel quality information, and the like. Specifically, the device B 110-2 has determined the optimal beam direction through the procedure illustrated in FIG. 17A, and thus may transmit the feedback information through an optimal beam. The device A 110-1 does not know a beam direction in which the device A 110-1 is to receive the feedback information, and thus sweeps multiple beam directions as illustrated in FIG. 17B. At this time, a signal, that the device B 110-2 has transmitted through any one antenna array, namely, a signal transmitted with any one polarization characteristic, may be received with good quality through at least one of the antenna arrays included in the device A 110-1. Specifically, the determination of an optimal beam direction by the device A 110-1 and the reception of the feedback information by the device A 110-1, which use the reference signal, may be simultaneously performed in one procedure.

Referring to FIG. 17C, the device A 110-1 and the device B 110-2 perform data communication with each other in optimal beam directions. At this time, the device A 110-1 forms multiple beams, and the device B 110-2 forms one beam. Accordingly, the device A 110-1 may perform diversity transmission and diversity reception. In other words, the device A 110-1 may receive a signal, that the device B 110-2 transmits, through multiple beams in an overlapping manner, or may transmit a signal to the device B 110-2 through multiple beams in an overlapping manner. Specifically, the device A 110-1 may transmit or receive one stream through multiple beams in an overlapping manner.

Figure 18A:
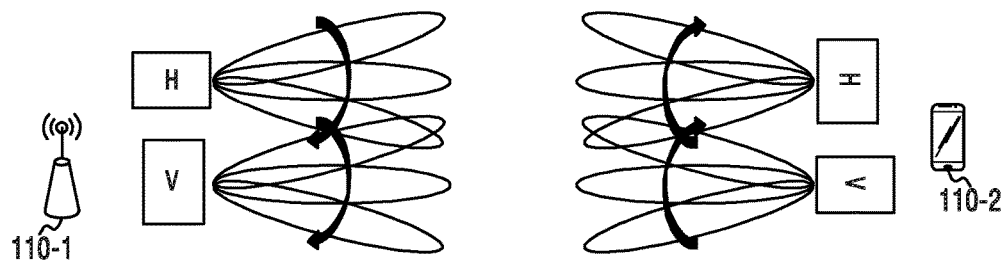
FIGS. 18A to 18C illustrate a beam search procedure for a device belonging to group 2 in a wireless communication system according to an embodiment of the present disclosure.
Figure 18B:
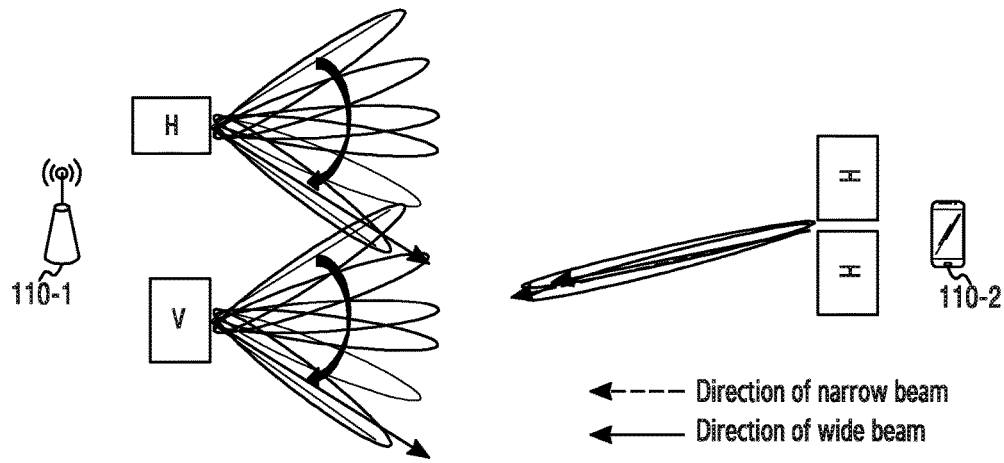
Figure 18C:
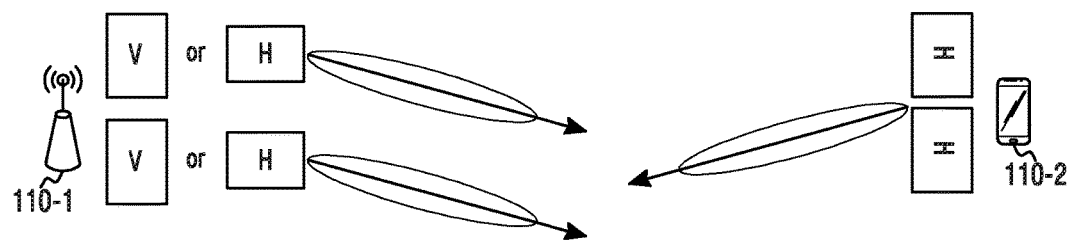

FIGS. 18A to 18C illustrate a beam search procedure for a device belonging to group 2 in a wireless communication system according to an embodiment of the present disclosure. FIG. 18A may be understood as corresponding to operation 1401 illustrated in FIG. 14, and FIG. 18B may be understood as corresponding to operation 1415 illustrated in FIG. 14.

Referring to FIG. 18A, the device A 110-1 and the device B 110-2 simultaneously form two beams having different polarization characteristics. The device A 110-1 and the device B 110-2 sweep all of the beam directions through the beams having the different polarization characteristics. At this time, the device A 110-1 may transmit reference signals, and the device B 110-2 may measure a signal strength. In order to identify combinations of all of the beam directions, it is required to transmit reference signals M×N times wherein M×N is obtained by multiplying the number N of beam directions of the device A 110-1 by the number M of beam directions of the device B 110-2. Accordingly, the device B 110-2 may measure signal strengths or channel qualities of multiple beam direction combinations, and may determine that a reception beam direction belonging to a beam direction combination corresponding to the maximum signal strength is an optimal beam direction for the device A 110-1. Further, the device B 110-2 may determine an optimal transmission beam direction for the device A 110-1 over the device B 110-2.

Referring to FIG. 18B, the device B 110-2 transmits reference signals in the optimal beam direction. At this time, the device B 110-2 transmits the reference signals through either of a beam having a horizontal polarization characteristic and a beam having a vertical polarization characteristic. Specifically, the device B 110-2 uses a narrower beam than in the case of FIG. 18A, and accordingly, sweeps a range of an optimal beam direction, which has been selected with the wide beam as a reference, through the narrow beam. In response, the device A 110-1 sweeps all of the beam directions by using both a reception beam having the horizontal polarization characteristic and a reception beam having the vertical polarization characteristic. In this case, in order to identify combinations of all of the beam directions, it is required to transmit reference signals N×$L_{MS}$ times. In the present example, N represents the number of directions of wide beams of the device A 110-1, and $L_{MS}$ represents the number of narrow beams corresponding to one wide beam of the device B 110-2. Accordingly, the device A 110-1 may measure signal strengths or channel qualities of multiple beam direction combinations, and may determine that a reception beam direction belonging to a beam direction combination corresponding to the maximum signal strength is an optimal beam direction for the device A 110-1.

In the procedure illustrated in FIG. 18B, the device B 110-2 may transmit, to the device A 110-1, feedback information including a beam index, channel quality information, and the like. Specifically, the device B 110-2 has determined the optimal beam direction through the procedure illustrated in FIG. 18A, and thus may transmit the feedback information through an optimal beam. The device A 110-1 does not know a beam direction in which the device A 110-1 is to receive the feedback information, and thus sweeps multiple beam directions as illustrated in FIG. 18B. At this time, a signal, that the device B 110-2 has transmitted through any one antenna array, namely, a signal transmitted with any one polarization characteristic, may be received with good quality through at least one of the antenna arrays included in the device A 110-1. Specifically, the determination of an optimal beam direction by the device A 110-1 and the reception of the feedback information by the device A 110-1, which use the reference signal, may be simultaneously performed in one procedure.

Referring to FIG. 18C, the device A 110-1 and the device B 110-2 perform data communication with each other in optimal beam directions. At this time, the device A 110-1 forms multiple beams all having an identical polarization characteristic, and the device B 110-2 forms one beam. In this case, as compared with the case of FIGS. 17A to 17C, independence between beams may reduce, but it is advantageous in that beams having better channel quality can be used. At this time, in order to improve the independence between the beams, the device B 110-2 may apply additional processing (e.g., phase shift) to a signal transmitted through any one beam. The device A 110-1 may perform diversity transmission and diversity reception. In other words, the device A 110-1 may transmit or receive one signal through multiple beams in an overlapping manner.

Referring to the FIGS. 17A to 17C, and FIGS. 18A to 18C, when data communication is performed, the device A 110-1 may use multiple beams having different polarization characteristics, or may use multiple beams all having an identical polarization characteristic. To this end, in the process illustrated in FIG. 17B or FIG. 18B, the device A 110-1 may determine that polarization characteristics of beams may be set to be different from each other or identical to each other.

Specifically, the device A 110-1 measures the received strengths of signals received through reception beams having different polarization characteristics. When a difference between the received strengths of the signals is less than or equal to a predefined threshold, the device A 110-1 uses multiple beams having different polarization characteristics, as illustrated in FIG. 17C. In contrast, when the difference between the received strengths of the signals exceeds the predefined threshold, the device A 110-1 uses multiple beams all having an identical polarization characteristic, as illustrated in FIG. 18C. At this time, a used polarization is a polarization corresponding to a larger signal strength. Specifically, when a channel quality difference between the reception beams having the different polarization characteristics is greater than a threshold, the device A 110-1 may use at least one beam having a polarization characteristic corresponding to better channel quality among the different polarization characteristics.

As another example, the device A 110-1 first uses multiple beams having different polarization characteristics, as illustrated in FIG. 17C. While using the multiple beams having the different polarization characteristics, the device A 110-1 may adjust a polarization as illustrated in FIG. 18C according to signal strengths of the respective polarizations. Specifically, when a difference between the signal strengths of the polarizations exceeds a predefined threshold, the device A 110-1 may use multiple beams all having an identical polarization characteristic, as illustrated in FIG. 18C. At this time, a used polarization is a polarization corresponding to a larger signal strength. Specifically, when a channel quality difference between the reception beams having the different polarization characteristics is greater than a threshold, the device A 110-1 may use at least one beam having a polarization characteristic corresponding to better channel quality among the different polarization characteristics.

Figure 19A:
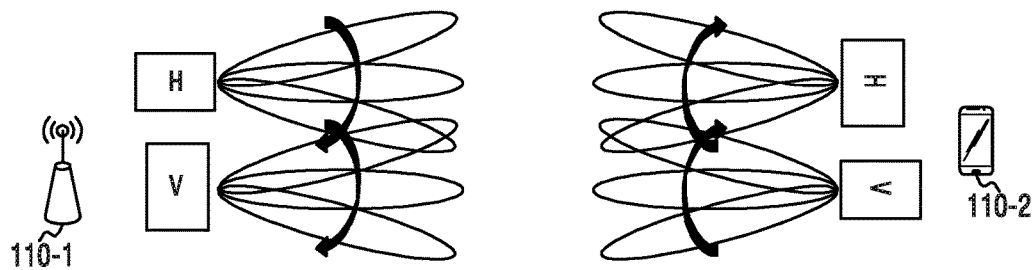
FIGS. 19A to 19C illustrate a beam search procedure for a device belonging to group 3 in a wireless communication system according to an embodiment of the present disclosure.
Figure 19B:
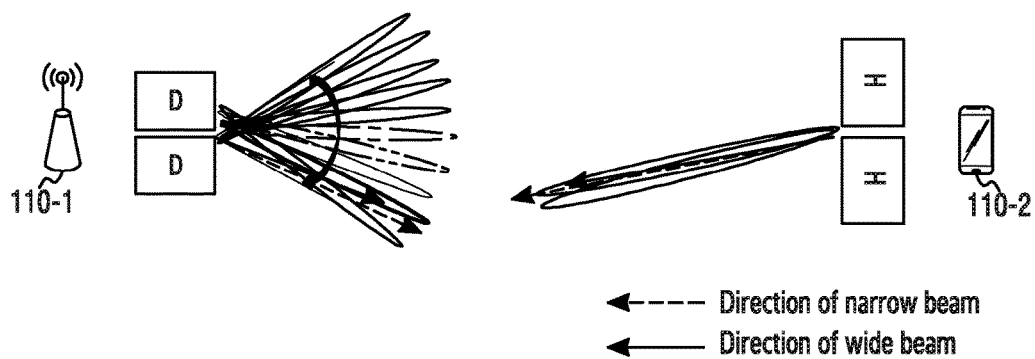
Figure 19C:
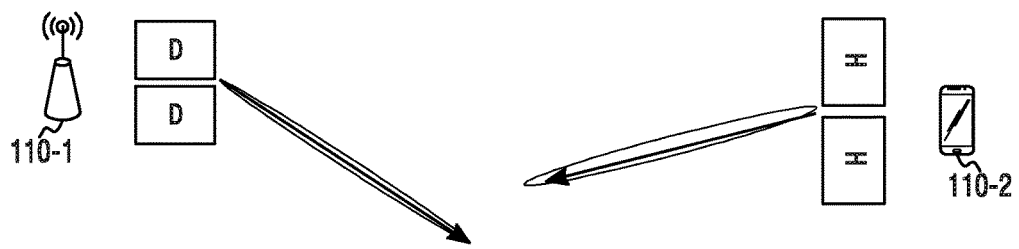

FIGS. 19A to 19C illustrate a beam search procedure for a device belonging to group 3 in a wireless communication system according to an embodiment of the present disclosure. FIG. 19A may be understood as corresponding to operation 1401 illustrated in FIG. 14, and FIG. 19B may be understood as corresponding to operation 1421 illustrated in FIG. 14.

Referring to FIG. 19A, the device A 110-1 and the device B 110-2 simultaneously form two beams having different polarization characteristics. The device A 110-1 and the device B 110-2 sweep all of the beam directions through the beams having the different polarization characteristics. At this time, the device A 110-1 may transmit reference signals, and the device B 110-2 may measure a signal strength. In order to identify combinations of all of the beam directions, it is required to transmit reference signals M×N times wherein M×N is obtained by multiplying the number N of beam directions of the device A 110-1 by the number M of beam directions of the device B 110-2. Accordingly, the device B 110-2 may measure signal strengths or channel qualities of multiple beam direction combinations, and may determine that a reception beam direction belonging to a beam direction combination corresponding to the maximum signal strength is an optimal beam direction for the device A 110-1. Further, the device B 110-2 may determine an optimal transmission beam direction for the device A 110-1 over the device B 110-2.

Referring to FIG. 19B, the device B 110-2 transmits reference signals in the optimal beam direction. At this time, the device B 110-2 transmits the reference signals through either of a beam having a horizontal polarization characteristic and a beam having a vertical polarization characteristic. Specifically, the device B 110-2 uses a narrower beam than in the case of FIG. 19A, and accordingly, sweeps a range of an optimal beam direction, which has been selected with the wide beam as a reference, through the narrow beam. In response, the device A 110-1 sweeps all of the beam directions by using both a narrow reception beam having the horizontal polarization characteristic and a narrow reception beam having the vertical polarization characteristic. In this case, in order to identify combinations of all of the beam directions, it is required to transmit reference signals N×$L_{MS}$×$L_{BS}$ times. In the present example, N represents the number of directions of wide beams of the device A 110-1, $L_{MS}$ represents the number of narrow beams corresponding to one wide beam of the device B 110-2, and $L_{BS}$ represents the number of narrow beams corresponding to one wide beam of the device A 110-1. Accordingly, the device A 110-1 may measure signal strengths or channel qualities of multiple beam direction combinations, and may determine that a reception beam direction belonging to a beam direction combination corresponding to the maximum signal strength is an optimal beam direction for the device A 110-1.

In the procedure illustrated in FIG. 19B, the device B 110-2 may transmit, to the device A 110-1, feedback information including a beam index, channel quality information, and the like. Specifically, the device B 110-2 has determined the optimal beam direction through the procedure illustrated in FIG. 19A, and thus may transmit the feedback information through an optimal beam. The device A 110-1 does not know a beam direction in which the device A 110-1 is to receive the feedback information, and thus sweeps multiple beam directions as illustrated in FIG. 19B. At this time, a signal, that the device B 110-2 has transmitted through any one antenna array, namely, a signal transmitted with any one polarization characteristic, may be received with good quality through at least one of the antenna arrays included in the device A 110-1. Specifically, the determination of an optimal beam direction by the device A 110-1 and the reception of the feedback information by the device A 110-1, which use the reference signal, may be simultaneously performed in one procedure.

Referring to FIG. 19C, the device A 110-1 and the device B 110-2 perform data communication with each other in optimal beam directions. At this time, the device A 110-1 forms one narrow beam by activating all of the different polarization characteristics, and the device B 110-2 forms one beam. In this case, as compared with the cases of FIGS. 16A to 16C to FIGS. 18A to 18C, a beam gain may become largest.

Figure 20A:
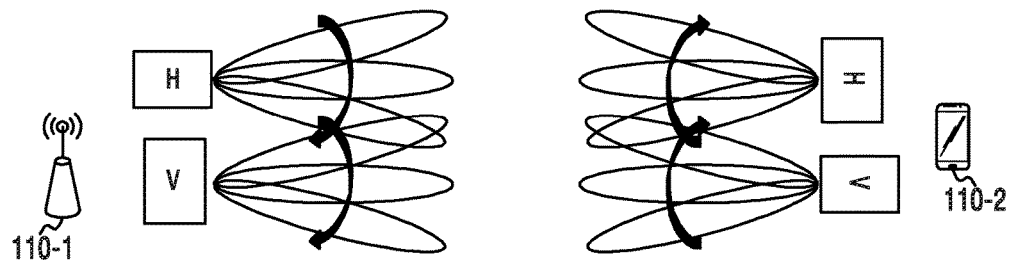
FIGS. 20A to 20C illustrate a beam search procedure for a device belonging to group 3 in a wireless communication system according to an embodiment of the present disclosure.
Figure 20B:
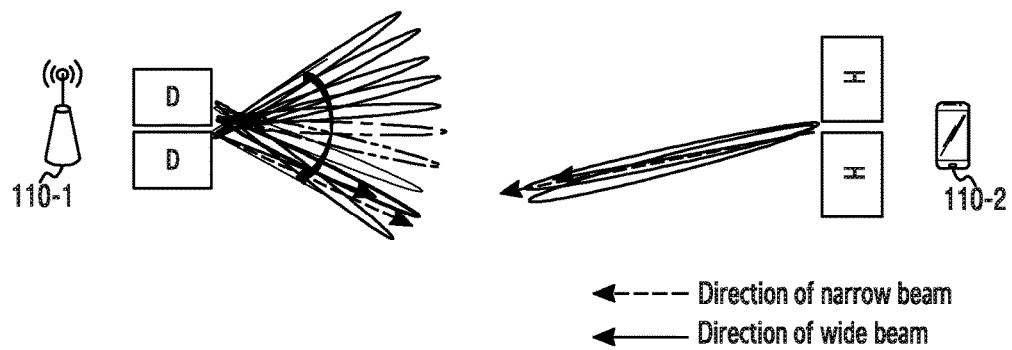
Figure 20C:
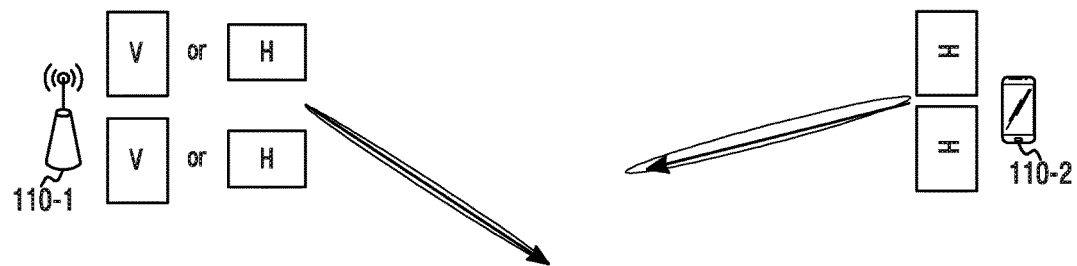

FIGS. 20A to 20C illustrate a beam search procedure for a device belonging to group 3 in a wireless communication system according to an embodiment of the present disclosure. FIG. 20A may be understood as corresponding to operation 1401 illustrated in FIG. 14, and FIG. 20B may be understood as corresponding to operation 1421 illustrated in FIG. 14.

Referring to FIG. 20A, the device A 110-1 and the device B 110-2 simultaneously form two beams having different polarization characteristics. The device A 110-1 and the device B 110-2 sweep all of the beam directions through the beams having the different polarization characteristics. At this time, the device A 110-1 may transmit reference signals, and the device B 110-2 may measure a signal strength. In order to identify combinations of all of the beam directions, it is required to transmit reference signals M×N times wherein M×N is obtained by multiplying the number N of beam directions of the device A 110-1 by the number M of beam directions of the device B 110-2. Accordingly, the device B 110-2 may measure signal strengths or channel qualities of multiple beam direction combinations, and may determine that a reception beam direction belonging to a beam direction combination corresponding to the maximum signal strength is an optimal beam direction for the device A 110-1. Further, the device B 110-2 may determine an optimal transmission beam direction for the device A 110-1 over the device B 110-2.

Referring to FIG. 20B, the device B 110-2 transmits reference signals in the optimal beam direction. At this time, the device B 110-2 transmits the reference signals through either of a beam having a horizontal polarization characteristic and a beam having a vertical polarization characteristic. Specifically, the device B 110-2 uses a narrower beam than in the case of FIG. 20A, and accordingly, sweeps a range of an optimal beam direction, which has been selected with the wide beam as a reference, through the narrow beam. In response, the device A 110-1 sweeps all of the beam directions by using both a narrow reception beam having the horizontal polarization characteristic and a narrow reception beam having the vertical polarization characteristic. In this case, in order to identify combinations of all of the beam directions, it is required to transmit reference signals N×$L_{MS}$×$L_{BS}$ times. In the present example, N represents the number of directions of wide beams of the device A 110-1, $L_{MS}$ represents the number of narrow beams corresponding to one wide beam of the device B 110-2, and $L_{BS}$ represents the number of narrow beams corresponding to one wide beam of the device A 110-1. Accordingly, the device A 110-1 may measure signal strengths or channel qualities of multiple beam direction combinations, and may determine that a reception beam direction belonging to a beam direction combination corresponding to the maximum signal strength is an optimal beam direction for the device A 110-1.

In the procedure illustrated in FIG. 20B, the device B 110-2 may transmit, to the device A 110-1, feedback information including a beam index, channel quality information, and the like. Specifically, the device B 110-2 has determined the optimal beam direction through the procedure illustrated in FIG. 20A, and thus may transmit the feedback information through an optimal beam. The device A 110-1 does not know a beam direction in which the device A 110-1 is to receive the feedback information, and thus sweeps multiple beam directions as illustrated in FIG. 20B. At this time, a signal, that the device B 110-2 has transmitted through any one antenna array, namely, a signal transmitted with any one polarization characteristic, may be received with good quality through at least one of the antenna arrays included in the device A 110-1. Specifically, the determination of an optimal beam direction by the device A 110-1 and the reception of the feedback information by the device A 110-1, which use the reference signal, may be simultaneously performed in one procedure.

Referring to FIG. 20C, the device A 110-1 and the device B 110-2 perform data communication with each other in optimal beam directions. At this time, the device A 110-1 forms one narrow beam by activating one polarization characteristic, and the device B 110-2 forms one beam. In this case, as compared with the case of FIGS. 19A to 19C, it is advantageous in that power consumption is reduced.

Referring to the embodiments of FIGS. 19A to 19C and FIGS. 20A to 20C, when data communication is performed, the device A 110-1 may use a beam having dual-polarization characteristics, or may use a beam having one polarization characteristic. To this end, in the process illustrated in FIG. 17B or 18B, the device A 110-1 may determine whether multiple polarization characteristics are to be used or one polarization characteristic is to be used.

Specifically, the device A 110-1 measures the received strengths of signals received through reception beams having different polarization characteristics. When the received strength of any one beam is less than or equal to a predefined threshold, the device A 110-1 may use only one remaining polarization as illustrated in FIG. 20C. In contrast, when the received strengths of all of the beams exceed the predefined threshold, the device A 110-1 may simultaneously use multiple polarization characteristics as illustrated in FIG. 19C.

As another example, the device A 110-1 first uses multiple polarization characteristics as illustrated in FIG. 17C. While using the multiple polarization characteristics, the device A 110-1 may use only one polarization as illustrated in FIG. 20C according to signal strengths of the respective polarizations. Specifically, when a received strength of any one beam is less than or equal to a predefined threshold, the device A 110-1 may use only one remaining polarization as illustrated in FIG. 20C.

The above-described beam search procedure may be performed differently for each group, to which a device belongs. Accordingly, in view of the multiple groups, the devices may perform the beam search procedure according to a frame structure illustrated in FIG. 21 or 22.

Figure 21:
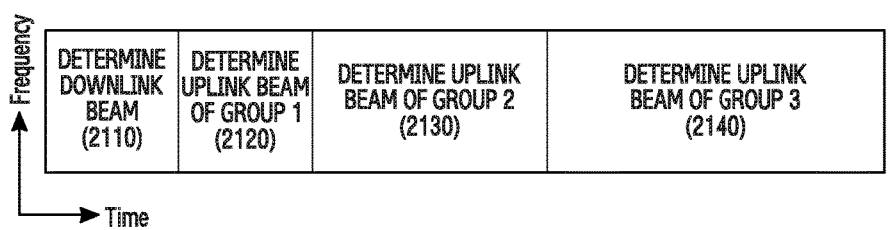
FIG. 21 illustrates resource utilization for searching for a beam for each group in a wireless communication system according to an embodiment of the present disclosure.

FIG. 21 illustrates resource utilization for searching for a beam for each group in a wireless communication system according to an embodiment of the present disclosure.

Referring to FIG. 21, during a period 2110, downlink beams of multiple devices are determined. Specifically, during the period 2110, the operations illustrated in FIGS. 15A and 15B, 16A to 16C, 17A to 17C, 18A to 18C, 19A to 19C, and FIG. 20A are performed. After the period 2110, respective groups of the devices are determined.

During a period 2120, an uplink beam of at least one device belonging to group 1 is determined. For example, during the period 2120, the operation illustrated in FIG. 16B may be performed. In addition, during the period 2120, the at least one device may transmit feedback information, which includes an optimal downlink transmission beam index, channel quality, and the like, to a node (e.g., the device A 110-1) that controls a beam search procedure.

During a period 2130, an uplink beam of at least one device belonging to group 2 is determined. For example, during the period 2130, the operation illustrated in FIG. 17B or 18B may be performed. In addition, during the period 2130, the at least one device may transmit feedback information, which includes an optimal downlink transmission beam index, channel quality, and the like, to a node (e.g., the device A 110-1) that controls a beam search procedure.

During a period 2140, an uplink beam of at least one device belonging to group 3 is determined. For example, during the period 2140, the operation illustrated in FIG. 19B or 20B may be performed. In addition, during the period 2140, the at least one device may transmit feedback information, which includes an optimal downlink transmission beam index, channel quality, and the like, to a node (e.g., the device A 110-1) that controls a beam search procedure.

Figure 22:
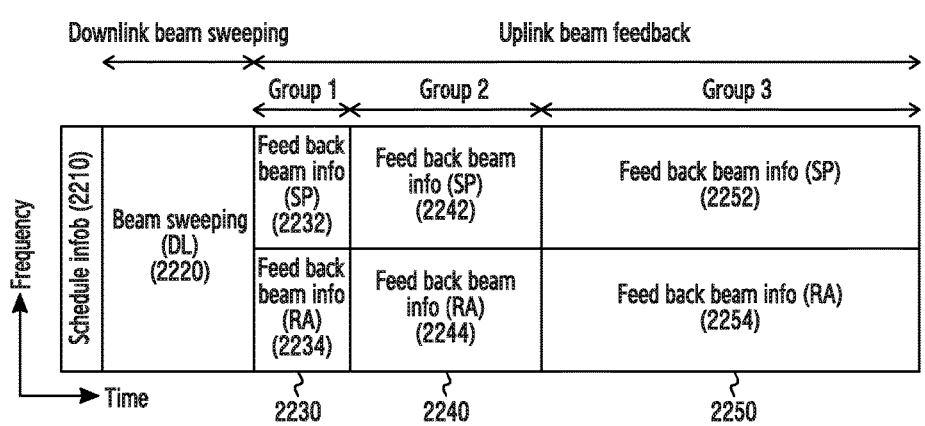
FIG. 22 illustrates resource utilization for searching for a beam for each group in a wireless communication system according to an embodiment of the present disclosure.

FIG. 22 illustrates resource utilization for searching for a beam for each group in a wireless communication system according to an embodiment of the present disclosure. FIG. 22 illustrates a case in which a period for beam information feedback is divided into SP resources and RA resources.

Referring to FIG. 22, during a period 2210, schedule information is transmitted to devices. The schedule information includes allocation information on SP resources 2232, 2242, and 2252. The period 2210 may include a broadcast channel. The schedule information may be a part of system information.

During a period 2220, downlink beams of multiple devices are determined. In a process for determining the downlink beams, groups of the devices are not determined. Specifically, during the period 2220, the operations illustrated in FIGS. 15A and 15B, 16A to 16C, 17A to 17C, 18A to 18C, 19A to 19C, and 20A are performed. After the period 2220, respective groups of the devices are determined.

During a period 2230, an uplink beam of at least one device belonging to group 1 is determined. For example, during the period 2230, the operation illustrated in FIG. 16B may be performed. At this time, a device that is capable of using the SP resource 2232 transmits feedback information through the SP resource 2232, and a device that is not capable of using the SP resource 2232 transmits feedback information through a RA resource 2234. The SP resource 2232 is a resource allocated to a particular device, and is allocated by the schedule information delivered during the period 2210.

During a period 2240, an uplink beam of at least one device belonging to group 2 is determined. For example, during the period 2240, the operation illustrated in FIG. 17B or 18B may be performed. At this time, a device that is capable of using the SP resource 2242 transmits feedback information through the SP resource 2242, and a device that that is not capable of using the SP resource 2242 transmits feedback information through a RA resource 2244. The SP resource 2242 is a resource allocated to a particular device, and is allocated by the schedule information delivered during the period 2210.

During a period 2250, an uplink beam of at least one device belonging to group 3 is determined. For example, during the period 2250, the operation illustrated in FIG. 19B or 20B may be performed. At this time, a device that is capable of using the SP resource 2252 transmits feedback information through the SP resource 2252, and a device that that is not capable of using the SP resource 2252 transmits feedback information through a RA resource 2254. The SP resource 2252 is a resource allocated to a particular device, and is allocated by the schedule information delivered during the period 2210.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An apparatus for performing beamforming, the apparatus comprising:
   a transceiver; and
   at least one processor operatively coupled with the transceiver,
   wherein the at least one processor is configured to control to:
      determine a number of beams to be formed through a first antenna array and a second antenna array, and
      transmit a signal using at least one beam corresponding to the number of beams,
      wherein, when the number of beams is equal to 1, a first polarization characteristic of the first antenna array is identical to a second polarization characteristic of the second antenna array, and
      wherein, when the number of beams is equal to or greater than 2, the first polarization characteristic of the first antenna array is different from the second polarization characteristic of the second antenna array.

2. The apparatus of claim 1,
   wherein the at least one processor is further configured to control to:
      form a single beam by using the first antenna array and the second antenna array, when the number of the beams is equal to 1, and form a beam by using the first antenna array and another beam by using the second antenna array, when the number of the beams is equal to 2.

3. The apparatus of claim 1, wherein each of antenna elements of the first antenna array comprises multiple sub-units configured to generate a radio wave having different polarization characteristics.

4. The apparatus of claim 1, wherein, when the number of beams is equal to or greater than 2, the at least one processor is further configured to control to form multiple beams having different polarization characteristics.

5. The apparatus of claim 1, wherein antenna elements of the first antenna array are arranged with a distance corresponding to a carrier frequency.

6. The apparatus of claim 1, wherein the at least one processor is further configured to control to determine at least one of a polarization characteristic, a beamwidth, and the number of the beams which are to be used for beam search associated with another device.

7. The apparatus of claim 6, wherein the at least one processor is further configured to control to:
sweep one-half of beam directions through a beam having the first polarization characteristic, and
sweep the remaining one-half of the beam directions through a beam having the second polarization characteristic.

8. The apparatus of claim 6, wherein the at least one processor is further configured to control to:
sweep all beam directions through a beam having the first polarization characteristic, and
sweep all of the beam directions through a beam having the second polarization characteristic.

9. The apparatus of claim 8, wherein the at least one processor is configured to control to transmit the signal through the beam having the first polarization characteristic and the beam having the second polarization characteristic, when a channel quality difference between the beam having the first polarization characteristic and the beam having the second polarization characteristic is less than or equal to a threshold.

10. The apparatus of claim 8, wherein the at least one processor is configured to control to transmit the signal through at least one beam having a polarization characteristic corresponding to better channel quality among the first polarization characteristic and the second polarization characteristic, when a channel quality difference between the beam having the first polarization characteristic and the beam having the second polarization characteristic is greater than a threshold.

11. The apparatus of claim 6, wherein the at least one processor is further configured to control to sweep all beam directions through a beam having multiple polarization characteristics.

12. The apparatus of claim 1, wherein the at least one processor is further configured to control to:
determine an optimal beam direction and optimal channel quality for another device, and
determine at least one of a polarization characteristic, a beamwidth, the number of the beams, and a number of times of transmission of the feedback information for transmitting feedback information including the channel quality, based on the channel quality.

13. The apparatus of claim 12, wherein, when a second beamwidth for transmitting the feedback information is narrower than a first beamwidth used during the determination of the channel quality, the at least one processor is further configured to control to sweep a range of the first beamwidth through a transmission beam having the second beamwidth.

14. The apparatus of claim 12, wherein the at least one processor is further configured to control to transmit the feedback information during a resource period determined based on the channel quality.

15. A method for operating a device for performing beamforming, the method comprising:
determining a number of beams to be formed through a first antenna array and a second antenna array; and
transmitting a signal using at least one beam corresponding to the number of beams,
wherein, when the number of beams is equal to 1, a first polarization characteristic of the first antenna array is identical to a second polarization characteristic of the second antenna array, and
wherein, when the number of beams is equal to or greater than 2, the first polartization characteristic of the first antenna array is different from the second polarization characteristic of the second antenna array.

16. The method of claim 15, further comprising:
forming one beam by using the first antenna array and the second antenna array, when the number of the beams is equal to 1; and
forming one beam by using the first antenna array and another beam by using the second antenna array, when the number of the beams is equal to 2.

17. The method of claim 15, wherein each of antenna elements of the first antenna array comprises multiple sub-units configured to generate a radio wave having different polarization characteristics.

18. The method of claim 15, further comprising when the number of beams is equal to or greater than 2, forming multiple beams having different polarization characteristics.

19. The method of claim 15, wherein antenna elements of the first antenna array are arranged with a distance corresponding to a carrier frequency.

20. The method of claim 15, further comprising:
determining at least one of a polarization characteristic, a beamwidth, and the number of the beams which are to be used for beam search associated with another device.

* * * * *